United States Patent
Heine et al.

(10) Patent No.: US 6,603,225 B2
(45) Date of Patent: Aug. 5, 2003

(54) BRUSHLESS SPINDLE DC MOTOR AS AN ACTUATOR TO CREATE RADIAL FORCE

(75) Inventors: Gunter K. Heine, Aptos, CA (US); Hans Leuthold, Santa Cruz, CA (US); Christian Fleury, Rossemaison (CH)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/764,766

(22) Filed: Jan. 16, 2001

(65) Prior Publication Data

US 2001/0033115 A1 Oct. 25, 2001

Related U.S. Application Data

(63) Continuation of application No. 09/029,043, filed on Feb. 24, 1998, now Pat. No. 6,201,322.

(51) Int. Cl.⁷ .............................. H02K 7/04; G11B 17/02
(52) U.S. Cl. ..................... 310/67 R; 310/51; 310/68 B; 360/99.08
(58) Field of Search ............................ 310/90.5, 68 B, 310/51, 67 R; 360/98.07, 99.08, 99.11, 99.04

(56) References Cited

U.S. PATENT DOCUMENTS

| | | | | |
|---|---|---|---|---|
| 4,227,107 A | * | 10/1980 | Ban et al. | 310/198 |
| 4,841,204 A | * | 6/1989 | Studer | 318/254 |
| 4,922,169 A | * | 5/1990 | Freeman | 318/254 |
| 5,164,622 A | * | 11/1992 | Kordik | 310/67 R |
| 5,376,851 A | * | 12/1994 | Lipo et al. | 310/179 |
| 5,376,852 A | * | 12/1994 | Kawamura et al. | 310/198 |
| 5,396,388 A | * | 3/1995 | Brown | 360/106 |
| 5,459,383 A | * | 10/1995 | Sidman et al. | 318/611 |
| 5,636,193 A | * | 6/1997 | Ohmi | 369/53 |
| 5,675,450 A | * | 10/1997 | Kadlec | 360/78.09 |
| 5,723,931 A | * | 3/1998 | Andrey | 310/179 |
| 5,936,370 A | * | 8/1999 | Fukao et al. | 318/652 |
| 5,949,162 A | * | 9/1999 | Mishkevich et al. | 310/51 |

* cited by examiner

*Primary Examiner*—Burton Mullins
(74) *Attorney, Agent, or Firm*—Moser, Patterson and Sheridan, LLP

(57) ABSTRACT

An apparatus for stabilizing the spin axis of a rotating system, the rotating system having a rotor and motor means to cause rotation of the rotor about the spin axis and a magnet, windings, a source of drive current and an actuator combined with the motor means and forming a source of actuator current energizing the windings to generate a radial force which stabilizes the position of the spin axis and dampens other than rotational movements of the rotor.

16 Claims, 23 Drawing Sheets

$F_x = |\vec{F}_{react}| \cdot \sin(\beta)$
$F_y = |\vec{F}_{react}| \cdot \cos(\beta+\pi)$
$F_y = -|\vec{F}_{react}| \cdot \cos(\beta)$ ⊕ away from the reader: −I ⊙ towards the reader: +I phase 1: +1 −3 +5 −7 +9 −11

(a) Practical circuit of three-phase bipolar driven motor, and arrangement of Hall elements; the number in [ ] correspond to waveform numbers in Fig.

BRUSHLESS SPINDLE DC MOTOR AS AN ACTUATOR TO CREATE RADIAL FORCE

CROSS-REFERENCE TO RELATED APPLICATIONS

This application is a continuation of Ser. No. 09/029,043 filed Feb. 24, 1998 now U.S. Pat. No. 6,201,322

This invention is useful in the system disclosed in U.S. patent application Ser. No. 09/029,044, entitled "ACTIVE ELECTROMAGNETIC DAMPING SYSTEM FOR SPINDLE MOTORS" by inventors Gunter Karl Heine, Hans Leuthold and Christian Fleury, filed simultaneously herewith and incorporated herein by reference.

The system is useful with all known brushless D.C. motors; it is also useful with motor designs such as shown in U.S. Pat. No. 5,590,003 issued Dec. 31, 1996, entitled "IRONLESS SPINDLE MOTOR FOR A DISC DRIVE", as well as U.S. Pat. No. 5,598,071 issued Jan. 28, 1997, entitled "SINGLE-PHASE SPINDLE MOTOR", both assigned to the assignee of this invention and incorporated herein by reference.

FIELD OF THE INVENTION

The present invention relates generally to motors and the vibrations or resonances which are set up within such motors; particular applications or examples will be given with respect to spindle motors used in disc drive assemblies, but the application of this invention is not limited to these specific examples. The invention discloses actuators for eliminating such resonances.

BACKGROUND OF THE INVENTION

Most motors, indeed most rotating systems that are spinning about a fixed axis, have vibrations or harmonics which are set up and become part of the system, disturbing the overall stability and smooth operation of the system. Such problems are particularly acute in the disc drive industry, where a spindle motor mounts and supports a disc or disc pack for high speed rotation. The disk drive industry is continually seeking to obtain a head disc assembly (HDA) capable of operating with an increased track density which requires greater resistancy to shock and vibration.

As the operating demands on the HDA increase, problems associated with conventional HDA systems become performance limiting factors: for example non-repetitive run-out (NRR) associated with conventional ball bearings limits track spacing and, thus, reduces the track density at which the HDA can reliably operate. NRR is associated with the highly complex dynamic behavior of the hard disk drives: mechanical modes of the motor and the disc pack correspond to predicted mechanical resonance, which are in turn exited by ball bearing vibration. To reduce NRR magnitude, the vibrational characteristics of the drive have to be modified. Some standard solutions: to use a non-contact bearing (like magnetic or hydrodynamic bearings) which does not create any vibration and thus does not excite the resonance modes.

In the prior art, a number of efforts have been made to electronically damp vibration associated with a motor or with a transducer in a disc drive. The prior art to damp vibrations in a moving transducer in order to more quickly center it on a track includes U.S. patents to Song, U.S. Pat. No. 4,414,497; Sidman, U.S. Pat. No. 5,459,383; and Ravizza, U.S. Pat. No. 4,080,636. Each of these comprise elaborate circuitry for adding feedback loops to more quickly damp out the vibrations or movements in a moving transducer. All of these are not associated with problems of damping out vibrations in a motor or the disc itself, and also add considerable complexity and costs to the system.

Other patents have added mechanical or electromechanical elements to the motor itself in an effort to damp out vibrations in the motor. These patents include Hasigawa, U.S. Pat. No. 5,317,466; Bartec, U.S. Pat. No. 4,198,863; Clancey, U.S. Pat. No. 4,286,202. These patents are especially directed to the addition of mechanical or electromechanical elements to motors to detect and damp out vibration. Again, these prior art approaches have not proven to be effective in detecting the resonance modes which can exist in rotating motors and particularly disc drive spindle motors, and damping out such resonances. Further, they add considerable cost and complexity to the motor design.

SUMMARY OF THE INVENTION

Therefore, an object of the present invention is to damp out the resonances which occur in a rotating system such as a disc drive spindle motor.

A related objective is to stabilize the spin axis of a rotating system in a given position.

It is a further objective of this invention to accurately simulate the undamped resonant movements of the rotating system, and then to apply an out of phase force to the rotating system to damp out the resonant movements.

It is a further related objective of the invention to apply an out of phase force which accurately and repeatably damps or attenuates the resonant movements and thereby stabilizes the system.

In this invention, the term "attenuation" is directly related to the fact that the force applied is out of phase with the resonant movements within the system. This is as opposed to the idea of adding a force which directly opposes the resonances which are occurring within the system, which would thereby add stiffness to the system, and constitutes the approach taken by the prior art. This would be the approach taken by an electromagnetic bearing, or the like, being added to the system.

It is a further objective of this invention to demonstrate that such undampened movements may be sensed and then appropriate forces applied through circuitry to damp out these movements.

Another objective of this invention is to demonstrate that the damping actuator may comprise windings of a motor supporting the rotating system.

Another objective of the invention is to establish that the actuator for damping out movements may comprise specific windings of the motor supporting the rotating system having currents of selected magnitude and phase applied thereto.

Yet another objective of the invention is to demonstrate an approach for selecting such windings in a motor, and the direction and magnitude of current flow in the winding to provide an effective damping actuator.

Thus, in the present invention, resonant movements are first simulated, and then a derivative of that representation is utilized to define a damping signal, lagging in phase, which controls the application of force to the system to damp out the resonance within the system. Thus, the damping method taught by this invention comprises measuring the movements of the system in time, and then lagging that very same force by ninety degrees and applying that damping force to correct the tendency for that movement to occur. Thus, according to the invention a movement at a given velocity is countered by a counter movement at a given velocity, so that movements at high frequency are successfully damped out. The success of this approach is based at least in part on the fact that the derivative of the representation of the movement always has velocity as a factor in its representation of the resonant movements of the rotating system. Thus, at higher frequency movements, this damping approach is substantially more effective than the addition of stiffness to the system would be.

In the following detailed description, equations will be generated to demonstrate that a radial force to dampen resonant movements in a highly responsive manner can be generated using additional windings within a spindle motor which is used herein as an exemplary rotating system. The coils are grouped in phases and energized to produce a radial force as required. An appropriate exemplary circuit for taking the representation of the undesired movement and creating and damping force through the application of current to the additional windings is also disclosed.

This detailed description is for example only; the principles of the analysis and invention could be applied utilizing the windings already present in the motor. For example, the windings could be tapped, and currents necessary to generate the stabilizing radial force be added to the normal motor driving currents. Alternatively, the regular driving currents could be turned off for a very brief period, and the calculated currents to create a radial force imposed on the same windings; the two currents could be alternated rapidly so that the momentum of the motor is maintained by these driving currents while the radial force is created by the calculated currents.

Other features and advantages of the present invention will become apparent to a person of skill in the art who studies the present invention disclosure, given with respect to the following figures.

DETAILED DESCRIPTION OF A PREFERRED EMBODIMENT

Figure 1A:
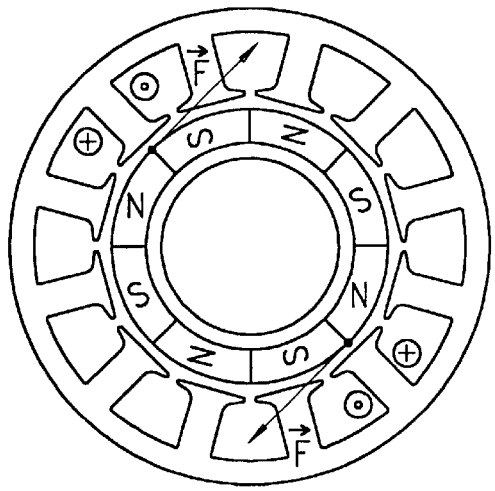
FIG. 1A shows that in supplying currents to a different combination of coils, it is possible to apply a torque on the rotor magnet.
Figure 1B:
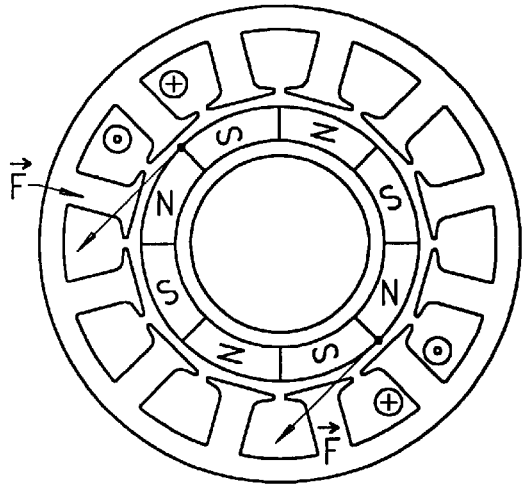
FIG. 1B shows that in supplying currents to a different combination of coil, it is possible to apply a radial force on the rotor magnet.
Figure 2A:
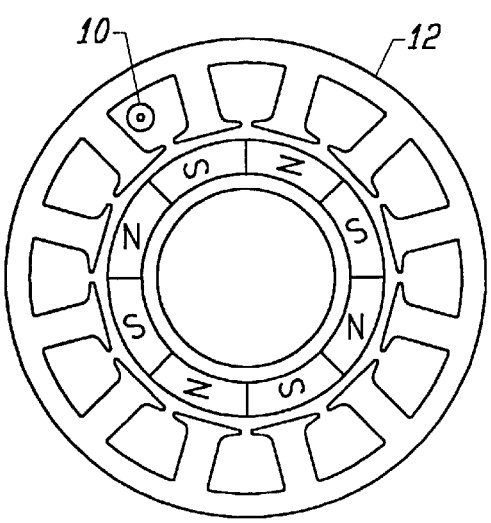
FIG. 2A shows a conductor placed in one slot of a Permanent Magnet Brushless DC Motor.
Figure 2B:
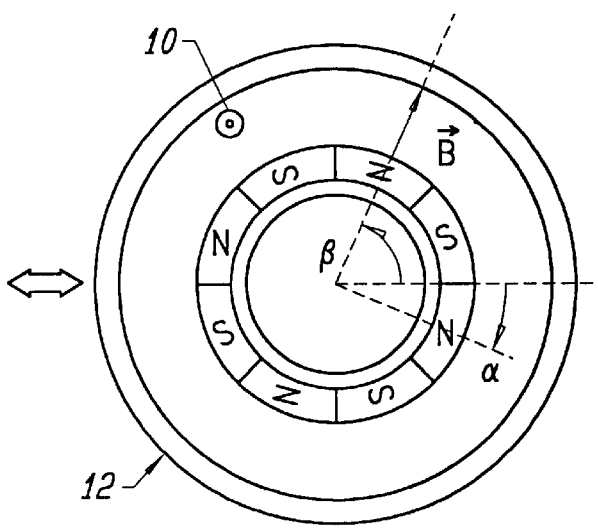
FIG. 2B illustrates the assumption that the conductor is directly placed in the air gap between the core and the magnet.

Standard design of spindle motor is intended to create a torque that spins the rotor. The objective of the present work is to create an additional radial force within the spindle motor using the spindle components (like the magnet and the stack) and specially calculated currents supplied to the coils or windings. FIGS. 1A and 1B show that by supplying a different combination of coils, it is possible to apply on the rotor magnet either a torque (FIG. 1A) or a radial force (FIG. 1B), depending on how the coil is wound, and the direction of current flow in the coil. The discussion and derivation below assuming for this example that a separate set of coils is added to the motor. This detailed description is for example only; the principles of the analysis and invention could be applied utilizing the windings already present in the motor. For example, the windings could be tapped, and currents necessary to generate the stabilizing radial force be added to the normal motor driving currents. Alternatively, the regular driving currents could be turned off for a very brief period, and the calculated currents to create a radial force imposed on the same windings; the two currents could be alternated rapidly so that the momentum of the motor is maintained by these driving currents while the radial force is created by the calculated currents.

For Permanent Magnet Brushless DC Motors, it is the interaction between the magnets and currents flowing through conductors that creates forces. Designing such a motor requires grouping conductors in coil and coils in phases in order to create a winding to usually produce torque in supplying the phases of this winding with currents that are function of the rotor position, a torque will act on the rotor and spin the motor, or, to produce a radial force as is desired in this invention. This design depends on parameters like the number of poles of the magnet and, for slotted motor, the number of slots in the stack. An analytical tool is proposed herein that allows design of a winding that produces radial force for different motor configurations.

This analytical tool is developed first in analyzing the force acting on the magnet due to one conductor, and then the force acting on the magnet due to one coil. The conclusion of this analysis shows how to combine coils in order to produce either torque or radial force.

This analytical tool is then used to study the most common configurations of slotted motors. Tables are then presented to describe the configurations compatible consistent with change with windings generating torque and/or radial force.

The slotless motor is then presented, as well as the corresponding tables describing the motor configurations compatible with winding torque and/or radial force.

Force Due to One Conductor

The force generation of one conductor placed in a magnetic field is based on the Fleming's left hand rule.

A conductor is placed in a magnetic field: if a current flows through the conductor, a force will act on it. The direction of the force is given by left hand rule illustrated in the same figure and the magnitude of the force is given is given by the following equation:

$$F = B \cdot I \cdot L \qquad (a.1)$$

where

B=magnetic flux density [T1]

I=electrical current [A]

L=effective length of the conductor [m]

F=force [N]

To determine the force generation of one conductor placed in one slot of a Permanent Magnet Brushless DC Motor (FIG. A.3$a$). can be based on the relationship if it is assumed that the conductor is directly placed in the airgap between the core and the magnet (FIG. A.3$b$). The magnitude of the airgap magnetic field (due to the magnet) is assumed to be a sinusoidal function of the angular position. Its direction is assumed to be radial and its magnitude is positive when going from the magnet to the core. The following equation gives the magnetic flux density for the angular position described in FIG. A.3$b$:

$$|\vec{B}| = \hat{B}_\delta \cdot \cos(p \cdot \phi) = \hat{B}_\delta \cdot \cos(p \cdot (\beta - \alpha)) \qquad (a.2)$$

where p=pair pole number

α=angular position of the magnet. This value is zero when a North pole is in line with the position reference.

β=angular position where the magnetic flux density is calculated.

$\hat{B}\delta$=peak value of the magnetic flux density. This value takes into account the airgap length, the type of magnet, the type of stack steel, the geometry of the teeth, the magnet magnetization, . . . From this value, calculated as the first harmonic of the flux density distribution in the airgap of the real slotted motor, depends the determination of the exact torque value, but it does not affect the winding design in term of coil combinations.

Figure 3A:
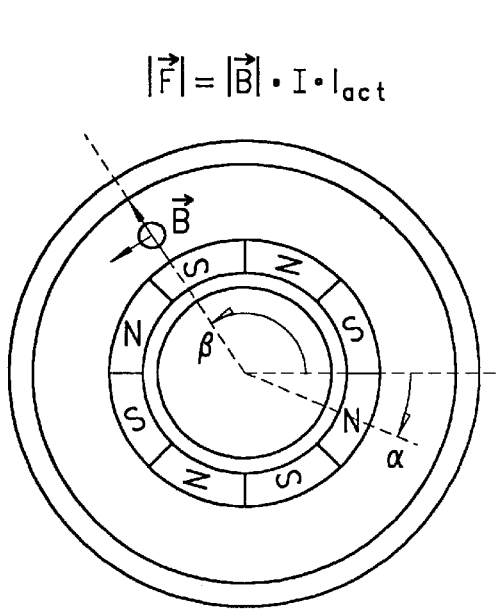
FIG. 3A shows the force acting on one conductor placed in the airgap.

Based on the preceding assumptions, it is possible to determine the force acting on one conductor placed in the airgap as described in FIG. 3A. As the magnetic flux density is given by equation (a2), the magnitude of this force is:

$$|\vec{F}| = 1_{act} \cdot I \cdot \hat{B}_\delta \cdot \cos(p \cdot \phi) = 1_{act} \cdot I \cdot \hat{B}_\delta \cdot \cos(p \cdot (\beta - \alpha)) \qquad (a.3)$$

where $1_{act}$=effective length of the conductor [m]

α=angular position of the magnet. This value is zero when a North pole is in line with the position reference.

β=angular position of the conductor.

Figure 3B:
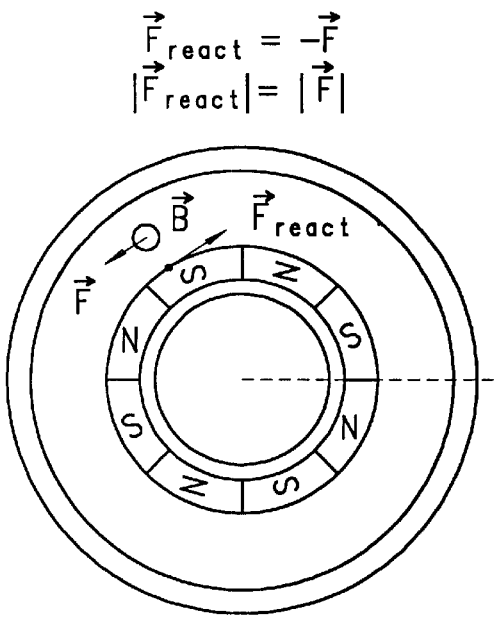
FIG. 3B shows the action and reaction rule, and the forces acting on the magnet due to current flowing through a conductor placed in the airgap.

Using the action and reaction rule as exemplified in FIG. 3B, the force acting on the magnet due to the current flowing through the conductor has the same magnitude but the opposite direction.

From the Fleming's rule and the assumed radial magnetic flux in the airgap, the force acting on the magnet is tangential. It is then possible to calculate the torque acting on the magnet:

$$T = r \cdot 1_{act} \cdot I \cdot \hat{B}_\delta \cdot \cos(p \cdot (\beta - \alpha)) \qquad (a.4)$$

where r=radius of the magnet [m]

Figure 4:
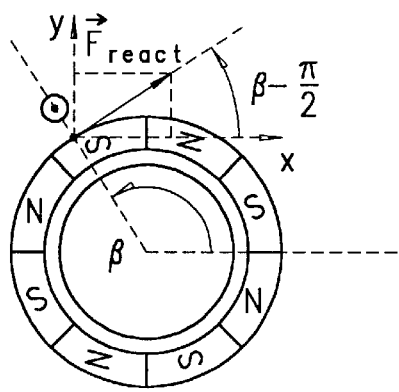
FIG. 4 shows the projection of the force analyzed in FIG. 3B on the x and y axis.

In order to be able to add the different forces due to several conductors, the Cartesian components of the force acting on the magnet have to be determined. FIG. 4 shows the projection of this force on the x and y axis.

The following expressions give the x and y components of the force acting on the magnet and due to one conductor:

$$F_x = 1_{act} \cdot I \cdot \hat{B}_\delta \cdot \cos(p \cdot (\beta - \alpha)) \cdot \sin(\beta) \quad (a.5)$$

$$F_y = -1_{act} \cdot I \cdot \hat{B}_\delta \cdot \cos(p \cdot (\beta - \alpha)) \cdot \cos(\beta) \quad (a.6)$$

Force Due to One Coil

Figure 5:
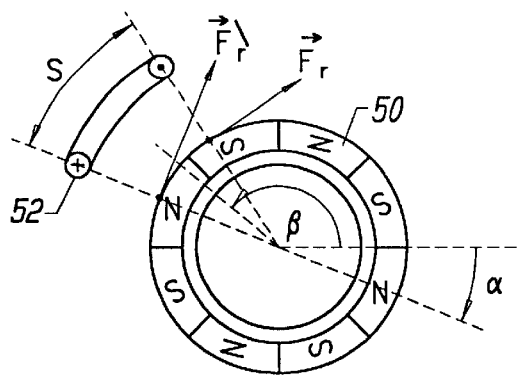
FIG. 5 shows two forces acting on a magnet when a coil composed of two conductors is placed in the airgap.

FIG. 5 shows two forces acting on the magnet 50 when a coil 52 composed of two conductors is placed in the airgap. As the currents flowing through these conductors are flowing through the same coil, their magnitude is identical but their sign is opposite.

The following parameters define the coil:

s = coil opening in radian, gives the angle between the two conductors $\beta$ = middle coil angular position $\alpha$ = rotor position Using expression (a.3), it is possible to determine the magnitude of both forces acting on the magnet 50;

$$|\vec{F}'_r| = -I_{act} \cdot I \cdot \hat{B}_\delta \cdot \cos\left(p \cdot \left(\beta - \alpha + \frac{s}{2}\right)\right) \quad (a.7)$$

$$|\vec{F}_r| = I_{act} \cdot I \cdot \hat{B}_\delta \cdot \cos\left(p \cdot \left(\beta - \alpha - \frac{s}{2}\right)\right) \quad (a.8)$$

Then the total torque acting on the magnet 50 can be determined:

$$T = r \cdot (|\vec{F}_r| + |\vec{F}'_r|) \quad (a.9)$$

$$T = r \cdot I_{act} \cdot \hat{B}_\delta \cdot I \cdot \left[\cos\left(p \cdot \left(\beta - \alpha - \frac{s}{2}\right)\right) - \cos\left(p \cdot \left(\beta - \alpha + \frac{s}{2}\right)\right)\right] \quad (a.10)$$

Using the trigonometric identity (a.11), the torque expression can be written in a way to separate the influence of the coil openings from the coil and rotor positions $\alpha$ and $\beta$:

$$\frac{1}{2} \cdot (\cos(A - B) - \cos(A + B)) = \sin(A) \cdot \sin(B) \quad (a.11)$$

$$T = r \cdot 1_{act} \cdot \hat{B}_\delta \cdot I \cdot 2 \cdot \left[\sin\left(p \cdot \frac{s}{2}\right) \cdot \sin(p \cdot (\beta - \alpha))\right] \quad (a.12)$$

Expression (a.12) shows that the coil openings can be chosen in order to maximize the torque. The Cartesian components Fx and Fy of the resulting force acting on the magnet 50 can also be determined:

$$F_x = F_{rx} + F'_{rx} = |\vec{F}_r| \cdot \sin\left(\beta - \frac{s}{2}\right) + |\vec{F}'_r| \cdot \sin\left(\beta + \frac{s}{2}\right) \quad (a.13)$$

$$F_x = 1_{act} \cdot \hat{B}_\delta \cdot \left[\cos\left(p \cdot \left(\beta - \frac{s}{2} - \alpha\right)\right) \cdot \sin\left(\beta - \frac{s}{2}\right) - \cos\left(p \cdot \left(\beta + \frac{s}{2} - \alpha\right)\right) \cdot \sin\left(\beta + \frac{s}{2}\right)\right] \quad (a.14)$$

$$F_y = F_{ry} + F'_{ry} = -|\vec{F}_r| \cdot \cos\left(\beta - \frac{s}{2}\right) + |\vec{F}'_r| \cdot \cos\left(\beta + \frac{s}{2}\right) \quad (a.15)$$

-continued $$F_y = 1_{act} \cdot I \cdot \hat{B}_\delta \cdot \left[-\cos\left(p \cdot \left(\beta - \frac{s}{2} - \alpha\right)\right) \cdot \cos\left(\beta - \frac{s}{2}\right) + \cos\left(p \cdot \left(\beta + \frac{s}{2} - \alpha\right)\right) \cdot \cos\left(\beta + \frac{s}{2}\right)\right] \quad (a.16)$$

The Cartesian components $F_x$ and $F_y$ (a.14) and (a.16) can transformed in the same way the torque expression (a.10) has been transformed in (a.12): to separate the influence of the coil openings from the coil and rotor positions $\alpha$ and $\beta$.

$F_x$ Component Manipulation

Using the trigonometric identity (a.17), the FX component expression (a.14) can be written in a way to separate the influence of the coil openings from the coil and rotor positions $\alpha$ and $\beta$:

$$\cos(A) \cdot \cos(B) = \frac{1}{2} \cdot (\sin(A - B) + \sin(A + B)) \quad (a.17)$$

$$F_x = 1_{act} \cdot I \cdot B_\delta \cdot \frac{1}{2} \cdot \left[\underbrace{\cos\left(p \cdot \left(\beta - \frac{s}{2} - \alpha\right)\right)}_{B_1} \cdot \underbrace{\sin\left(\beta - \frac{s}{2}\right)}_{A_1} - \underbrace{\cos\left(p \cdot \left(\beta + \frac{s}{2} - \alpha\right)\right)}_{B_2} \cdot \underbrace{\sin\left(\beta + \frac{s}{2}\right)}_{A_2}\right] \quad (a.18)$$

$$F_x = 1_{act} \cdot I \cdot B_\delta \cdot \frac{1}{2} \cdot \left[\underbrace{\sin\left(-(p-1) \cdot \left(\beta - \frac{s}{2}\right) + p \cdot \alpha\right)}_{A_1 - B_1} + \underbrace{\sin\left((p+1) \cdot \left(\beta - \frac{s}{2}\right) - p \cdot \alpha\right)}_{A_1 + B_1} - \underbrace{\sin\left(-(p-1) \cdot \left(\beta + \frac{s}{2}\right) + p \cdot \alpha\right)}_{A_2 - B_2} - \underbrace{\sin\left((p+1) \cdot \left(\beta + \frac{s}{2}\right) - p \cdot \alpha\right)}_{A_2 + B_2}\right] \quad (a.19)$$

In grouping the terms in (p+1) and the terms in (p−1):

$$F_x = 1_{act} \cdot I \cdot \hat{B}_\delta \cdot \frac{1}{2} \cdot \left[+\sin\left((p+1) \cdot \left(\beta - \frac{s}{2}\right) - p \cdot \alpha\right) - \sin\left((p+1) \cdot \left(\beta + \frac{s}{2}\right) - p \cdot \alpha\right) + \sin(-(p-1) \cdot \left(\beta - \frac{s}{2}\right) + p \cdot \alpha) - \sin\left(-(p-1) \cdot \left(\beta + \frac{s}{2}\right) + p \cdot \alpha\right)\right] \quad (a.20)$$

In separating the terms function of the angular position $\alpha$ and $\beta$ from the term function of the coil openings:

$$F_x = 1_{act} \cdot I \cdot \hat{B}_\delta \cdot \frac{1}{2} \cdot \left[+\sin\left((p+1) \cdot \beta - p \cdot \alpha - (p+1) \cdot \frac{s}{2}\right) - \sin\left((p+1) \cdot \beta - p \cdot \alpha + (p+1) \cdot \frac{s}{2}\right) + \sin(-(p-1) \cdot \beta + p \cdot \alpha + (p-1)\frac{s}{2}) - \sin(-(p-1) \cdot \beta + p \cdot \alpha - (p-1) \cdot \frac{s}{2}\right]$$

Using the identity $\sin(-x)=-\sin(x)$:

$$F_x = 1_{act} \cdot I \cdot \hat{B}_\delta \cdot \frac{1}{2} \cdot \left[ -\sin\left(-(p+1)\cdot\beta + p\cdot\alpha + (p+1)\cdot\frac{s}{2}\right) - \right. \quad (a.22)$$

$$\sin\left((p+1)\cdot\beta - p\cdot\alpha + (p+1)\cdot\frac{s}{2}\right) + \sin(-(p-1)\cdot$$

$$\beta + p\cdot\alpha + (p-1)\cdot\frac{s}{2}) + \sin(+(p-1)\cdot$$

$$\left. \beta - p\cdot\alpha + (p-1)\cdot\frac{s}{2}) \right]$$

Finally, using the trigonometric identity (a.23), the expression (a.22) becomes (a.25):

$$\sin(A)\cdot\cos(B) = \frac{1}{2}\cdot(\sin(A-B) + \sin(A+B)) \quad (a.23)$$

$$F_x = 1_{act}\cdot I \cdot \hat{B}_\delta \cdot \left[ -\sin(-\underbrace{((p+1)\cdot\beta - p\cdot\alpha)}_{B_3}) + \right. \quad (a.24)$$

$$\underbrace{(p+1)\cdot\frac{s}{2}}_{A_3}) - \sin(\underbrace{(p+1)\cdot\beta - p\cdot\alpha}_{B_3}) +$$

$$\underbrace{(p+1)\cdot\frac{s}{2}}_{A_3}) + \sin(-\underbrace{((p-1)\cdot\beta - p\cdot\alpha)}_{B_4}) +$$

$$\underbrace{(p-1)\cdot\frac{s}{2}}_{A_4}) + \sin(+\underbrace{(p-1)\cdot\beta - p\cdot\alpha}_{B_4}) +$$

$$\left. \underbrace{(p-1)\cdot\frac{s}{2}}_{A_4}) \right] \cdot \frac{1}{2}$$

$$F_x = 1_{act}\cdot I \cdot \hat{B}_\delta \cdot \left[ -\sin\underbrace{\left((p+1)\cdot\frac{s}{2}\right)}_{A_3} \cdot \cos\underbrace{((p+1)\cdot\beta - p\cdot\alpha)}_{B_3} + \right. \quad (a.25)$$

$$\left. \sin\underbrace{\left((p-1)\cdot\frac{s}{2}\right)}_{A_4} \cdot \cos\underbrace{((p-1)\cdot\beta - p\cdot\alpha)}_{B_4} \right]$$

Fy Component Manipulation

Using the trigonometric identity (a.26), the Fy component expression (a.16) can be written in a way to separate the influence of the coil opening s from the coil and rotor positions $\alpha$ and $\beta$:

$$\cos(A)\cdot\cos(B) = \frac{1}{2}\cdot(\cos(A-B) + \cos(A+B)) \quad (a.26)$$

$$F_y = 1_{act}\cdot I \cdot \hat{B}_\delta \cdot \left[ -\cos\underbrace{\left(p\cdot\left(\beta - \frac{s}{2} - \alpha\right)\right)}_{B_1} \cdot \cos\underbrace{\left(\beta - \frac{s}{2}\right)}_{A_1} + \right. \quad (a.27)$$

$$\left. \cos\underbrace{\left(p\cdot\left(\beta + \frac{s}{2} - \alpha\right)\right)}_{B_2} \cdot \cos\underbrace{\left(\beta - \frac{s}{2}\right)}_{A_2} \right]$$

-continued $$F_y = 1_{act}\cdot I \cdot \hat{B}_\delta \cdot \frac{1}{2} \cdot \left[ -\cos\underbrace{\left(-(p-1)\cdot\left(\beta - \frac{s}{2}\right) + p\cdot\alpha\right)}_{A_1-B_1} - \right. \quad (a.28)$$

$$\underbrace{\cos\left((p+1)\cdot\left(\beta - \frac{s}{2}\right) - p\cdot\alpha\right)}_{A_1+B_1} +$$

$$\underbrace{\cos(-(p-1)\cdot\left(\beta + \frac{s}{2}\right) + p\cdot\alpha)}_{A_2-B_2} +$$

$$\left. \underbrace{\cos\left((p+1)\cdot\left(\beta + \frac{s}{2}\right) - p\cdot\alpha\right)}_{A_2+B_2} \right]$$

In grouping the terms in (p+1) and the terms in (p−1):

$$F_y = 1_{act}\cdot I \cdot \hat{B}_\delta \cdot \frac{1}{2} \cdot \left[ -\cos\left((p+1)\cdot\left(\beta - \frac{s}{2}\right) - p\cdot\alpha + \right. \right. \quad (a.29)$$

$$\cos\left((p+1)\cdot\left(\beta + \frac{s}{2}\right) - p\cdot\alpha\right) - \cos(-(p-1)\cdot$$

$$\left(\beta - \frac{s}{2}\right) + p\cdot\alpha) + \cos(-(p-1)\cdot$$

$$\left. \left. \left(\beta + \frac{s}{2}\right) + p\cdot\alpha\right) \right]$$

In separating the terms function of the angular position $\alpha$ and $\beta$ from the terms which are a function of the coil openings:

$$F_y = 1_{act}\cdot I \cdot \hat{B}_\delta \cdot \frac{1}{2} \cdot \left[ -\cos\left((p+1)\cdot\beta - p\cdot\alpha - (p+1)\cdot\frac{s}{2}\right) + \right. \quad (a.30)$$

$$\cos\left((p+1)\cdot\beta - p\cdot\alpha + (p+1)\cdot\frac{s}{2}\right) - \cos(-(p-1)\cdot$$

$$\left(\beta + p\cdot\alpha + (p-1)\frac{s}{2}\right) + \cos(-(p-1)\cdot\beta + p\cdot\alpha -$$

$$\left. (p-1)\cdot\frac{s}{2}) \right]$$

Using the identity $\cos(-x)=\cos(x)$:

$$F_y = 1_{act}\cdot I \cdot \hat{B}_\delta \cdot \frac{1}{2} \cdot [-\cos(-(p+1)\cdot\beta + p\cdot\alpha + \quad (a.31)$$

$$(p+1)\cdot\frac{s}{2}) + \cos((p+1)\cdot\beta - p\cdot\alpha +$$

$$(p+1)\cdot\frac{s}{2}) - \cos(-(p-1)\cdot\beta + p\cdot\alpha +$$

$$(p-1)\frac{s}{2}) + \cos\left(+(p-1)\cdot\beta - p\cdot\alpha + (p-1)\cdot\frac{s}{2}\right)]$$

Finally, using the trigonometric identity (a.32), the expression (a.31) becomes (a.34):

$$\sin(A)\cdot\sin(\beta) = \frac{1}{2}\cdot(\cos(A-B) - \cos(A+B)) \quad (a.32)$$

-continued $$F_y = 1_{act} \cdot I \cdot \hat{B}_\delta \cdot \left[ -\cos\left( - \underbrace{((p+1) \cdot \beta - p \cdot \alpha)}_{B_3} \right) + \right.$$ (a.33)

$$\frac{\underbrace{(p+1) \cdot \frac{s}{2}}_{A_3}}{} + \cos\underbrace{((p+1) \cdot \beta - p \cdot \alpha)}_{B_3} +$$

$$\frac{\underbrace{(p+1) \cdot \frac{s}{2}}_{A_3}}{} - \cos\left( - \underbrace{((p-1) \cdot \beta - p \cdot \alpha)}_{B_4} \right) +$$

$$\frac{\underbrace{(p-1) \cdot \frac{s}{2}}_{A_4}}{} + \cos\left( + \underbrace{((p-1) \cdot \beta - p \cdot \alpha}_{B_4} + \right.$$

$$\left. \frac{\underbrace{(p-1) \cdot \frac{s}{2}}_{A_2}}{} \right] \cdot \frac{1}{2}$$

$$F_y = 1_{act} \cdot I \cdot \hat{B}_\delta \cdot \left[ -\sin\underbrace{\left((p+1) \cdot \frac{s}{2}\right)}_{A_3} \cdot \sin\underbrace{((p+1) \cdot \beta - p \cdot \alpha)}_{B_3} - \right.$$ (a.34)

$$\left. -\sin\underbrace{\left((p+1) \cdot \frac{s}{2}\right)}_{A_4} \cdot \sin\underbrace{((p-1) \cdot \beta - p \cdot \alpha)}_{B_4} \right]$$

The Cartesian Components $F_x$ and $F_y$

The following final expressions give the two Cartesian components $F_x$ and $F_y$ of the resulting force acting on the magnet when a one turn coil is supplied by a current I:

$$F_x = 1_{act} \cdot I \cdot \hat{B}_\delta \cdot \left[ -\sin\left((p+1) \cdot \frac{s}{2}\right) \cdot \cos((p+1) \cdot \beta - p \cdot \alpha) + \right.$$ (a.35)

$$\left. \sin\left((p-1) \cdot \frac{s}{2}\right) \cdot \cos((p-1) \cdot \beta - p \cdot \alpha) \right]$$

$$F_y = 1_{act} \cdot I \cdot \hat{B}_\delta \cdot \left[ -\sin\left((p+1) \cdot \frac{s}{2}\right) \cdot \sin((p+1) \cdot \beta - p \cdot \alpha) - \right.$$ (a.36)

$$\left. \sin\left((p-1) \cdot \frac{s}{2}\right) \cdot \sin((p-1) \cdot \beta - p \cdot \alpha) \right]$$

Coils Combination to Generate Torque

Figure 6A:
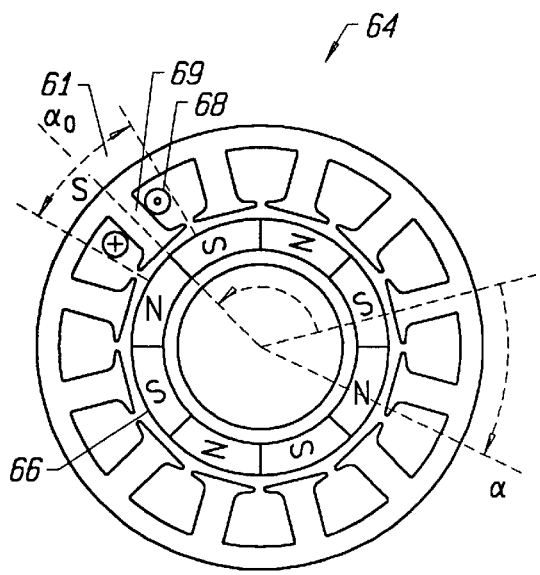
FIG. 6A shows a coil opening of one slot in a motor winding.
Figure 6B:
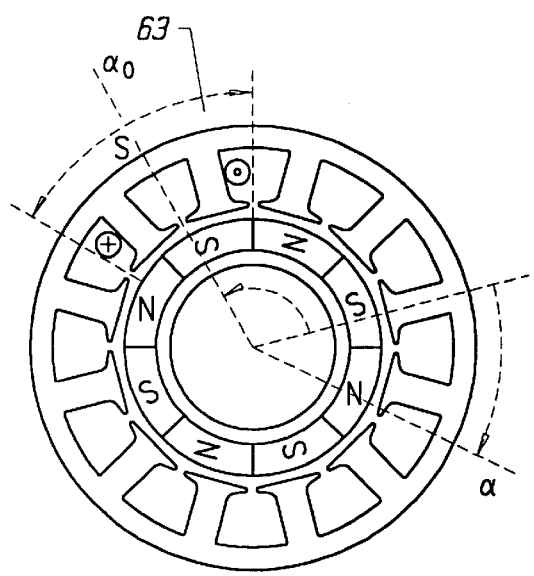
FIG. 6B shows a coil opening of two slots in a motor winding.

The method for designing a winding generating torque is a source of inspiration for finding a way to design a winding generating a radial force. This section presents an example using an 8 pole, 12 slot configuration (FIG. 5). FIGS. 6A and 6B shows how conductors 60 can be placed in the slots 62 of a motor 64 also including magnet 66 to form a coil. FIG. 6A shows a coil 68 concentric about a tooth 69. The exact conductor position in the slot is not really important to calculate the corresponding coil openings, 61. The coil opening 61 is rather defined as the angle between the middle points of the two slots containing the coil conductors. FIG. 6B shows a coil with a two slot coil opening 63.

As shown in expression (a.12), the coil opening s 61 or 63 only influences the torque magnitude. Expression (a.37) defines a coefficient $k_s$ describing the effectiveness of the coil 68. The torque generated by the coil 68 of FIGS. 6A and 6B is then given by (a.38).

$$k_s = \sin\left(p \cdot \frac{s}{2}\right)$$ (a.37)

$$T = r \cdot 1_{act} \cdot \hat{B}_\delta \cdot I \cdot 2 \cdot k_s \cdot \sin(p \cdot (\alpha_0 - \alpha))$$ (a.38)

where $\alpha_0$=middle coil angular position
$\alpha$=rotor position

The coil opening s, 61 or 63 is chosen in order to maximize the torque magnitude and also to provide a winding easy to build. The following table I shows that with a one slot coil opening, the winding will be concentric, and thus to build, without losing torque.

TABLE I

| s in slots | $\sin\left(p \cdot \frac{s}{2}\right)$ |
|---|---|
| 1 | 0.866 |
| 2 | 0.866 |

Tab A.9: Value of coefficient $k_s$ in function of the coil opening s.

Tab. A.9: Value of coefficient $k_s$ in function of the coil opening s.

Figure 7:
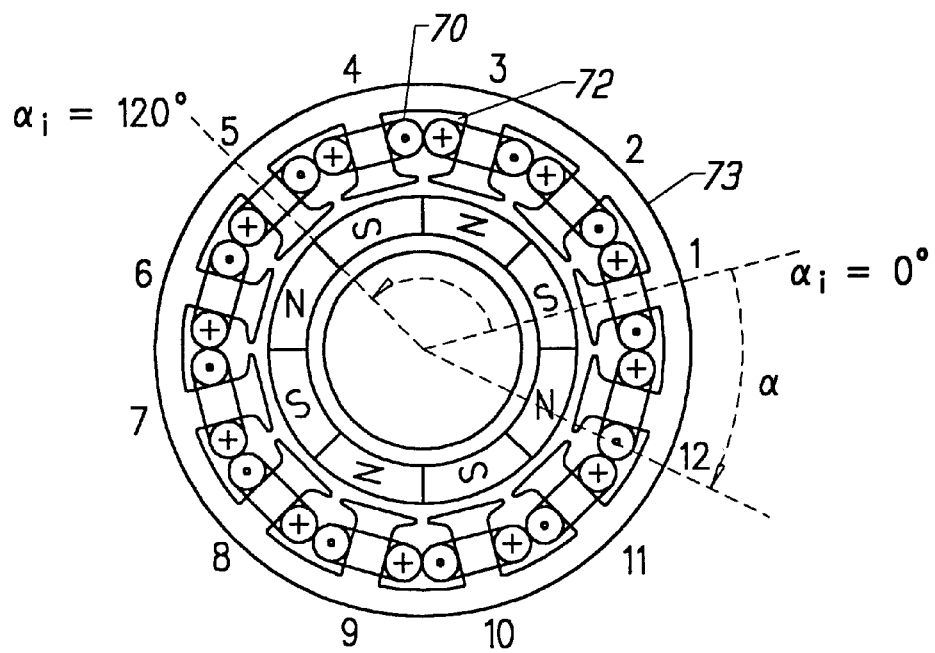
FIG. 7 shows 12 concentric coils placed in the 12 slots of the motor.

FIG. 7 shows that 12 concentric coils 70 can be placed in the 12 slots 72 of the motor 73.

The following Table II gives for the 12 coils of FIG. 7 their angular position $\alpha_i$ and the phase shift angle ($p\alpha_i$) of their torque, which is a sinusoidal function of the magnet position (expression (a.38).

TABLE II

| coil | $\alpha_i$ | $p \cdot \alpha_i$ |
|---|---|---|
| 1+ | 0 | 0 |
| 2 | 30 | 120 |
| 3 | 60 | 240 |
| 4+ | 90 | 0 |
| 5 | 120 | 120 |
| 6 | 150 | 240 |
| 7+ | 180 | 0 |
| 8 | 210 | 120 |
| 9 | 240 | 240 |
| 10+ | 270 | 0 |
| 11 | 300 | 120 |
| 12 | 330 | 240 |

Tab. A.11: 12 coils with their angular position and the shift angle of the torque they generate.

The analysis of the phase shift angle $p\alpha_i$ shows that the four coils shown in FIG. 7 (1, 4, 7, 10) generate a torque in phase, as well as the other 2 groups of coils (2, 5, 8, 11) and (3, 6, 9, 12). It can also be seen that the torque generated by these 3 coil groups are delayed by 120°. Connecting together the coils inside the same group will give the 3 phase winding shown in FIG. 8.

Using expressions (a.35) and (a.36), that give the two Cartesian components of the force generated by one coil, it is possible to check if supplying one phase of this winding will also generate a radial force. These components are given by a sum of two sinusoidal functions of the rotor position with two phase shift angle that are the product of the coil angular position by either (p+1) or (p-1).

Figure 8:
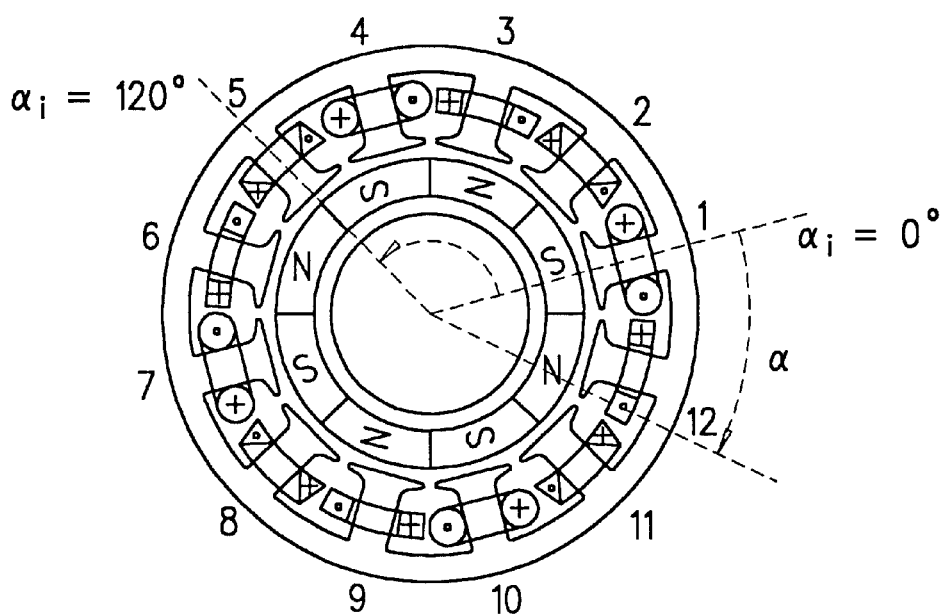
FIG. 8 shows a three phase winding generating torque for an eight pole, twelve slot motor.

The following table gives for the 12 coils of FIG. 8 their angular position $\alpha_i$ and the phase shift angle ($p\alpha_i$) of their torque, and the phase shift angle (p+1) $\alpha_i$ and (p-1) $\alpha_i$ of the Cartesian components of the force generated by these coils. In checking the first phase (coils 1, 4, 7 and 10), it can be noticed that the corresponding (p-1) $\alpha_i$ phase shift angle are (0, 270, 180 and 90): so the sum of these four sinusoidal components is void. In the same way, the corresponding (p+1) $\alpha_i$ phase shift angle are (0, 90, 180 and 270): so the sum of these four sinusoidal components is void.

TABLE III

| coil | $\alpha_i$ | $p \cdot \alpha_i$ | $(p - 1) \cdot \alpha_i$ | $(p + 1) \cdot \alpha_i$ |
|---|---|---|---|---|
| 1+ | 0 | 0 | 0 | 0 |
| 2 | 30 | 120 | 90 | 150 |
| 3 | 60 | 240 | 180 | 300 |
| 4+ | 90 | 0 | 270 | 90 |
| 5 | 120 | 120 | 0 | 240 |
| 6 | 150 | 240 | 90 | 30 |
| 7+ | 180 | 0 | 180 | 180 |
| 8 | 210 | 120 | 270 | 330 |
| 9 | 240 | 240 | 0 | 120 |
| 10+ | 270 | 0 | 90 | 270 |
| 11 | 300 | 120 | 180 | 60 |
| 12 | 330 | 240 | 270 | 210 |

Tab. A.12bis: 12 coils with their angular position $\alpha_i$ the shift angle p $\alpha_i$ of the torque they generate, the Cartesian component shift angles $(p - 1) \alpha_i$ and $(p + 1) \alpha_i$ of the force they generate.

So the 3 phase winding of FIG. 8 generates torque without generating radial force.

Coil Combinations to Generate a Radial Force

In this section, the analytical tool developed in this work is used to design a winding generating a radial force for the same motor configuration (8 poles 12 slots) as the one used in the preceding section, which presents a winding design to generate torque without generating radial force.

The method is similar to the preceding section. Assuming that 12 coils can be placed in the 12 slots of the stack (FIG. 7), the following table must be filled: it gives for the 12 coils their angular position $\alpha_i$, the phase shift angle $(p\alpha_i)$ of their torque, as well as the phase shift angle $(p-1) \alpha_i$ and $(p+1) \alpha_i$ of the Cartesian components of the force generated by these coils.

The analysis of this table shows that the coils (1, −3, 5, −7, 9, −11) generate a force with Cartesian component terms in (p−1) that are in phase. We assume that a coil number preceded by a negative sign corresponds to a coil supplied with a negative current: the phase shift angle is then delayed by 180 degrees.

For this coil group (1, −3, 5, −7, 9, −11), it can be noticed that the sum of the Cartesian component terms in (p+1) $\alpha_i$ is void (because the sum of three sinusoids with phase shift angle of (0, 120, and 240 is void). In the same way, the sum of the torque terms in $p\alpha_i$ is void.

TABLE IV

| coil | $\alpha_i$ | $p \cdot \alpha_i$ | $(p - 1) \cdot \alpha_i$ | $(p + 1) \cdot \alpha_i$ |
|---|---|---|---|---|
| 1+ | 0 | 0 | 0 | 0 |
| 2 | 30 | 120 | 90 | 150 |
| 3− | 60 | 240 | 180 | 300 |
| 4 | 90 | 0 | 270 | 90 |
| 5+ | 120 | 120 | 0 | 240 |
| 6 | 150 | 240 | 90 | 30 |
| 7− | 180 | 0 | 180 | 180 |
| 8 | 210 | 120 | 270 | 330 |
| 9+ | 240 | 240 | 0 | 120 |
| 10 | 270 | 0 | 90 | 270 |
| 11− | 300 | 120 | 180 | 60 |
| 12 | 330 | 240 | 270 | 210 |

Tab. A.13: 12 coils with their angular position $\alpha_i$ the shift angle p $\alpha_i$ of the torque they generate, the Cartesian component shift angles $(p - 1) \alpha_i$ and $(p + 1) \alpha_i$ of the force they generate.

So, in connecting in series the coils (1, −3, 5, −7, 9, −11), a phase generating a radial force is obtained.

Figure 9:
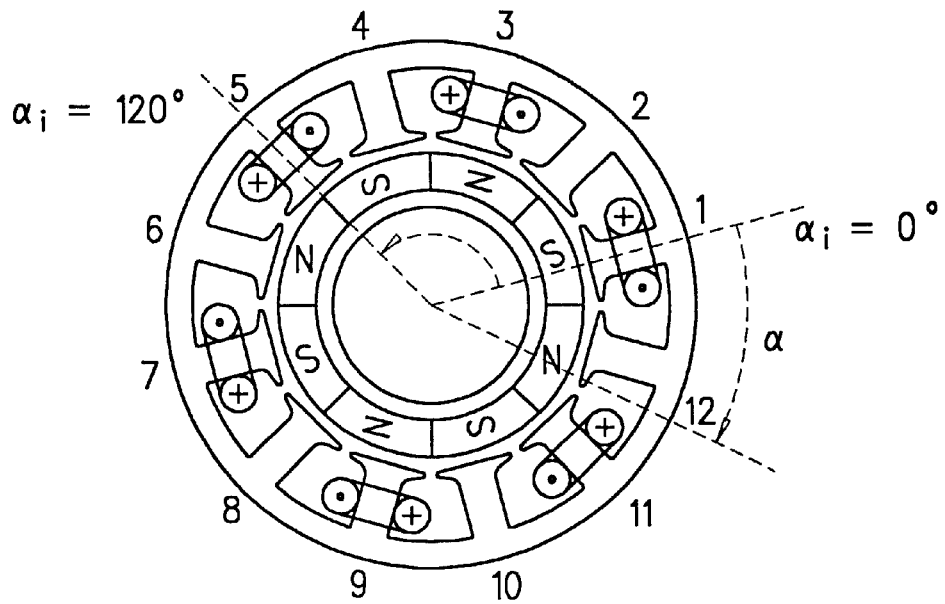
FIG. 9 shows a single phase of six coils generating a radial force.

If the phase of FIG. 9 is supplied with a constant current I, a radial force with the two following Cartesian components will be generated:

$$F_x = \hat{F} \cdot \cos(-p \cdot \alpha) = \hat{F} \cdot \cos(p \cdot \alpha) \quad (a.39)$$

$$F_y = -\hat{F} \cdot \sin(-p \cdot \alpha) = \hat{F} \cdot \sin(p \cdot \alpha) \quad (a.40)$$

where $$\hat{F} = 6 \cdot 1_{act} \cdot I \cdot \hat{B}_\delta \cdot \sin\left((p-1) \cdot \frac{s}{2}\right) \quad (a.41)$$

Figure 10:
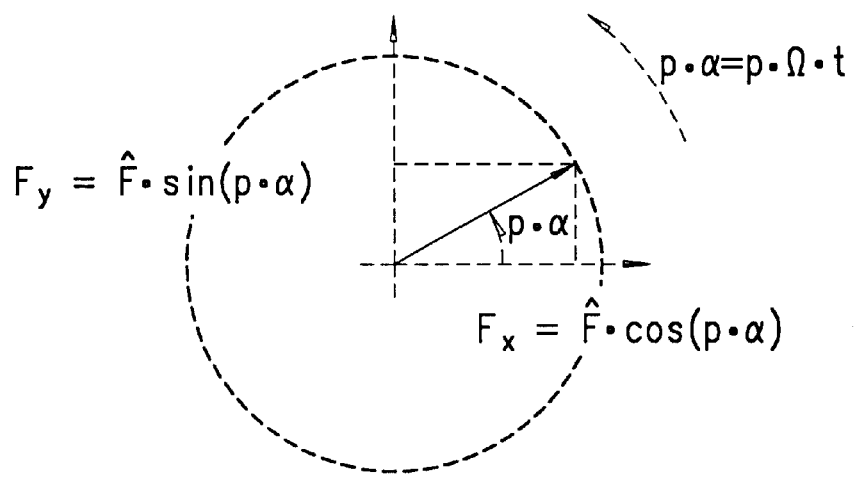
FIG. 10 shows one rotating radial force.

The magnitude of this radial force is constant and its direction depends on the rotor position. If the rotor spins with a constant speed $\Omega$, this radial force will rotate as shown in FIG. 10.

So, it is possible to change the magnitude of this force in-changing the current I. But it is impossible to change its direction which only depends on the rotor position.

Figure 11:
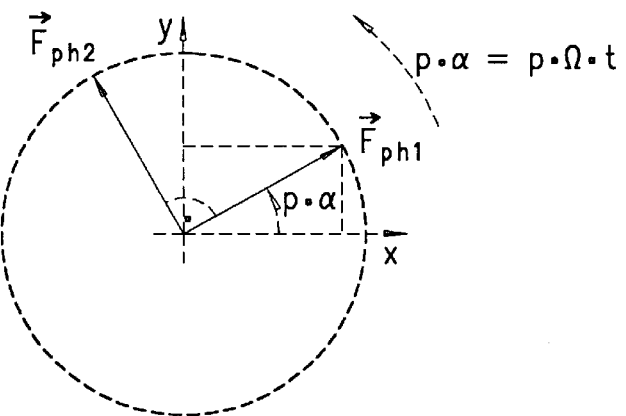
FIG. 11 shows two rotating radial forces in quadrature.

The analysis of table IV shows that supplying the coils (2, −4, 6, −8, 10, −12) of phase 2 with a positive current I will generate a radial force perpendicular to the one generated by the first phase (=coils 1, −3, 5, −7, 9, −11). FIG. 11 shows that in supplying these two phases with a constant current I, two rotating radial forces in quadrature are generated.

So, for a certain rotor position, it is possible to generate a radial force in every direction with every magnitude, just by changing the currents flowing in the two phases. The following expressions give the Cartesian components of these two forces in quadrature as a function of the phase currents iph1 and iph2:

Phase 1 (coils 1, −3, 5, −7, 9, −11):

$$F_{x1} = k_f \cdot i_{ph1} \cdot \cos(p \cdot \alpha) \quad (a.42)$$

$$F_{y1} = k_f \cdot i_{ph1} \cdot \sin(p \cdot \alpha) \quad (a.43)$$

Phase 2 (coils 2, −4, 6, −8, 10, −12):

$$F_{x2} = k_f \cdot i_{ph2} \cdot \cos\left(p \cdot \alpha - \frac{\pi}{2}\right) \quad (a.44)$$

$$F_{y2} = k_f \cdot i_{ph2} \cdot \sin\left(p \cdot \alpha - \frac{\pi}{2}\right) \quad (a.45)$$

where $$k_f = 6 \cdot 1_{act} \cdot \hat{B}_\delta \cdot \sin\left((p-1) \cdot \frac{s}{2}\right) \quad (a.46)$$

Expression (a.46) shows that the force magnitude is a function of the coil opening s. This parameter is chosen in order to maximize the radial force and also to have a winding easy to build. The following Table shows that the largest force is obtained with a two slot coil opening.

TABLE V

| s in slots | $\sin\left((p-1) \cdot \frac{s}{2}\right)$ |
|---|---|
| 1 | 0.707 |
| 2 | 1 |

Tab. A.17: Coil opening influence on the radial force magnitude.

Figure 12:
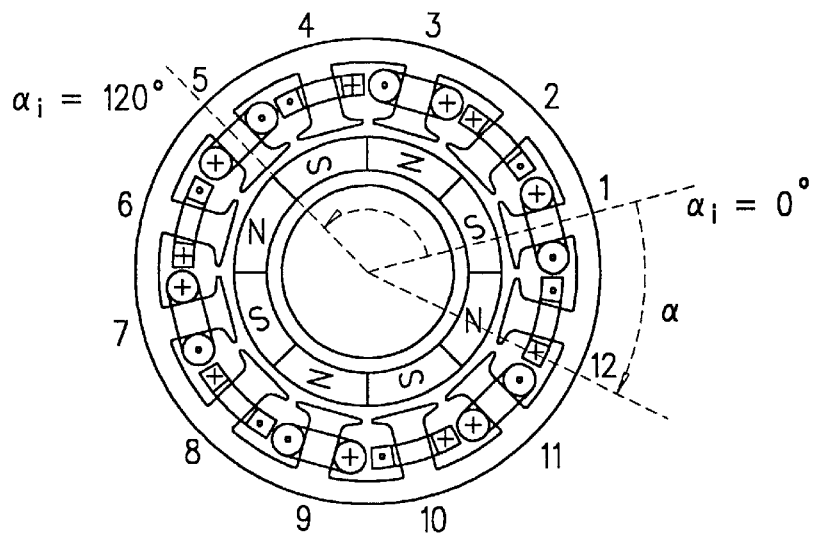
FIG. 12 shows a two phase winding generating two radial forces in quadrature, and a coil opening of one slot.
Figure 13:
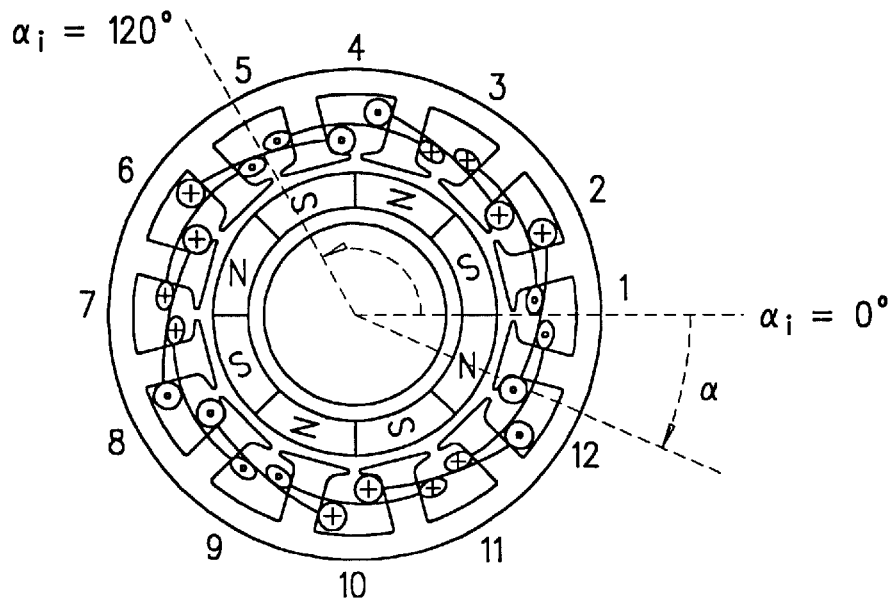
FIG. 13 shows a two phase winding generating two radial forces in quadrature, and a coil opening of two slots.

FIGS. 12 and 13 show two "2 phase winding" designs that generate two radial forces in quadrature. The winding with a one slot coil opening (FIG. 12) is easier to build, but needs 42% more current to generate the same force magnitude as the one generated with a two slot coil opening (FIG. 13).

Other Motor Configurations Compatible With a 2 Phase Winding Generating 2 Radial Forces in Quadrature The preceding section presented how to design a winding generating 2 radial forces in quadrature for a 8 pole, 12 slot motor configuration. The other motor configurations that can be used to realize such a winding are summed up by the expressions (a.47) and (a.48): they give 2 slot numbers ($Z_1$ and $Z_2$) for each pair pole number p.

$$Z_1=(p-1).4 \quad (a.47)$$

$$Z_2=(p+1).4 \quad (a.48)$$

The following table VI summarizes all these possible motor configurations for a pair pole number up to 6.

TABLE VI

| 2p | $Z_1$ | $Z_2$ |
|---|---|---|
| 2 | — | 8 |
| 4 | 4 | 12 |
| 6 | 8 | 16 |
| 8 | 12 | 20 |
| 10 | 16 | 24 |
| 12 | 20 | 28 |

Motor configurations (pole number 2p and slot number Z) compatible with a 2 phase winding generating 2 radial forces in quadrature.

The Slot number $Z_1$, corresponds to 2 groups of coils generating a force with Cartesian component term in (p−1) that are in phase, while the slot number $Z_2$ corresponds to 2 groups of coils generating a force with Cartesian component terms in (p+1) that are in phase (expressions (a.35) and (a.36)). The generated torque will be void.

Configurations Compatible With "3 Phase Torque Winding" and "2 Phase Radial Force Winding"

The first idea of this work was to take the component of a standard spindle and to generate an additional radial force by adding a second winding. As noted above, the regular motor windings could also be utilized. To make this idea possible, a configuration compatible with both torque and radial force currents must be chosen. The most usual solutions for three phase spindle motors are summarized in Table VII.

TABLE VIII

| | | | 2p | | |
|---|---|---|---|---|---|
| q | 2 | 4 | 6 | 8 | 12 |
| .25 | — | 3 | — | 6 | 9 |
| .375 | — | — | — | 9 | — |
| .5 | 3 | 6 | 9 | 12 | 18 |
| .75 | — | 9 | 12 | 18 | 27 |
| 1 | 6 | 12 | 18 | 24 | 36 | motor configurations(slot number in function of the pole number 2p and the slot number per pole and per phase q) compatible with a 3 phase winding generating torque.

The intersection between tables VI and VII gives the two configurations (4 poles 12 slots and 8 poles 12 slots) that are compatible with a three phase winding generating torque and a two phase winding generating two radial forces in quadrature.

Considering Other Phase Number for the Winding Generating Torque

To increase the number of solutions compatible for both torque and radial force windings, the phase number of these windings can be changed. The phase number of the winding generating torque is usually 3, but can be 2 or 5. The most usual solutions for five phase spindle motors are summarized in Table VIII.

TABLE VIII

| | | | 2p | | |
|---|---|---|---|---|---|
| q | 2 | 4 | 6 | 8 | 12 |
| .25 | — | 5 | — | 10 | 15 |
| .375 | — | — | — | 15 | — |
| .5 | 5 | 10 | 15 | 20 | 30 |
| .75 | — | 15 | 20 | 30 | 45 |
| 1 | 10 | 20 | 30 | 40 | 60 |

Tab. A.22: motor configurations(slot number in function of the pole number 2p and the slot number per pole and per phase q) compatible with a 5 phase winding generating torque.

The intersection between tables VI and VII gives one configuration (8 poles 20 slots) that is compatible with a five phase winding generating torque and a two phase winding generating two radial forces in quadrature.

Solutions for a 2 phase winding generating torque are more limited. For symmetric winding, it is not believed to be possible to have less than 1 slot per pole and phase (q≧1).

Table IX summarizes the motor configurations for a pair pole number p up to 6 and a slot number per pole and phase of 1 and 2.

TABLE IX

| | | | 2p | | |
|---|---|---|---|---|---|
| q | 2 | 4 | 6 | 8 | 12 |
| 1 | 4 | 8 | 12 | 16 | 24 |
| 2 | 8 | 16 | 24 | 32 | 48 |

A.23: motor configurations(slot number in function of the pole number 2p and the slot number per pole and per phase q) compatible with a 23 phase winding generating torque.

The intersection between tables VI and IX gives one configuration (2 poles 8 slots) that is compatible with a 2 phase winding generating torque and a 2 phase winding generating two radial forces in quadrature

Considering Other Phase Number for the Winding Generating Radial Force

Figures 14A, 14B:
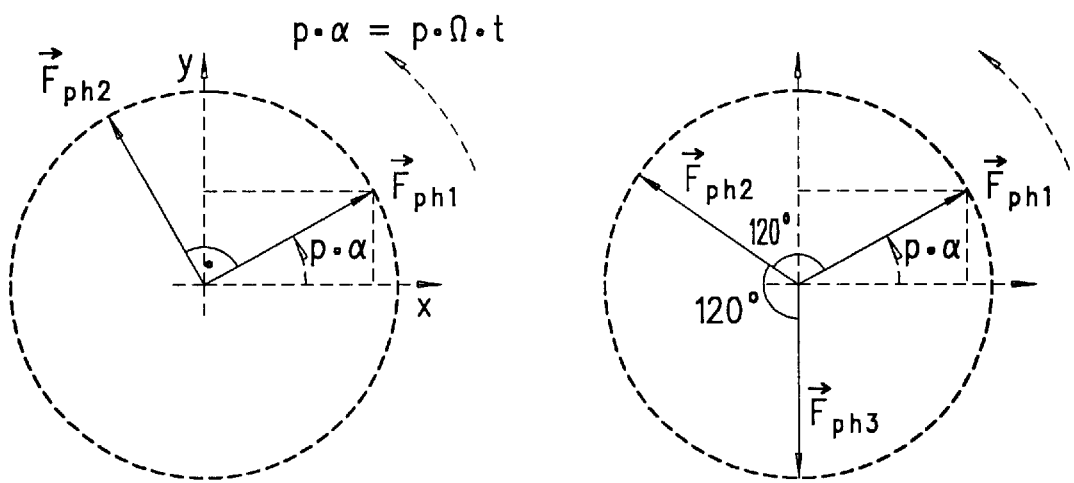
FIG. 14A shows two rotating forces in quadrature.
FIG. 14B shows three rotating forces separated by 120°.

As a 2 phase winding was considered to generate 2 rotating radial forces in quadrature (FIG. 14A), a three phase winding can be also be utilized to generate 3 rotating radial forces with direction separated by 120° (FIG. 14B). The motor configurations that can be used to realize such a winding are summarized by the expressions (a.49) and (a.50): they give 2 slot numbers ($Z_1$ and $Z_2$) for each pair pole number p.

$$Z_1=(p-1).6 \quad (a.49)$$

$$Z_2=(p+1).6 \quad (a.50)$$

The following table summarizes all these possible motor configurations for a pair pole number up to 6.

TABLE X

| 2p | $Z_1$ | $Z_2$ |
|---|---|---|
| 2  | —  | 8  |
| 4  | 4  | 12 |
| 6  | 8  | 16 |
| 8  | 12 | 20 |
| 10 | 16 | 24 |
| 12 | 20 | 28 |

Motor configurations (pole number 2p and slot number Z) compatible with a 3 phase winding generating 3 radial forces with direction separated by 120°.

Slot number $Z_1$ corresponds to 3 groups of coils generating a force with Cartesian component term in (p−1) that are in phase, when slot number $Z_2$ corresponds to 3 groups of coils generating a force with Cartesian component terms in (p+1) that are in phase (expressions (a.35) and (a.36)). The generated torque will be void. Annex 2 presents a description of all the 3 phase winding corresponding to the above table.

The intersection between tables VII and X gives two motor configurations (4 poles 6 slots and 8 poles 18 slots) that are compatible with a 3 phase winding generating torque and a 3 phase winding generating 3 radial forces with directions separated by 120°.

The intersection between tables VIII and X gives one motor configuration (8 poles 30 slots) that is compatible with a 5 phase winding generating torque and a 3 phase winding generating 3 radial forces with directions separated by 120°.

The intersection between tables IX and X gives two motor configurations (6 poles 12 slots and 6 poles 24 slots) that are compatible with a 2 phase winding generating torque and a 3 phase winding generating 3 radial forces with directions separated by 120°. All of these solutions are set forth in Table XI.

Summary of the Solutions for Slotted Motors

This study shows there are different possibilities to build a spindle motor that generates both torque and radial forces. For the solutions summarized in Table XI, both torque and radial force windings can share the slots of the same stack. This can be an important advantage for applications with high volume constraints. But it doesn't mean that the other motor configurations less important, as they can still be used for applications that don't need the torque and radial force windings to share the slots of the same stack. For these other applications the number of solutions is given by the combination of all the torque winding solutions (given in Tables VII, VIII and IX) and of all radial force winding solutions (given in Tables VI and X).

TABLE XI

| radial force winding | torque winding | | |
|---|---|---|---|
|  | 2 phases | 3 phases | 5 phases |
| 2 phases | (2 poles 8 slots) | (4 poles 12 slots) (8 poles 12 slots) | (8 poles 20 slots) |
| 3 phases | (6 poles 12 slots) (6 poles 24 slots) | (4 poles 6 slots) (8 poles 18 slots) | (8 poles 30 slots) |

Figure 15:
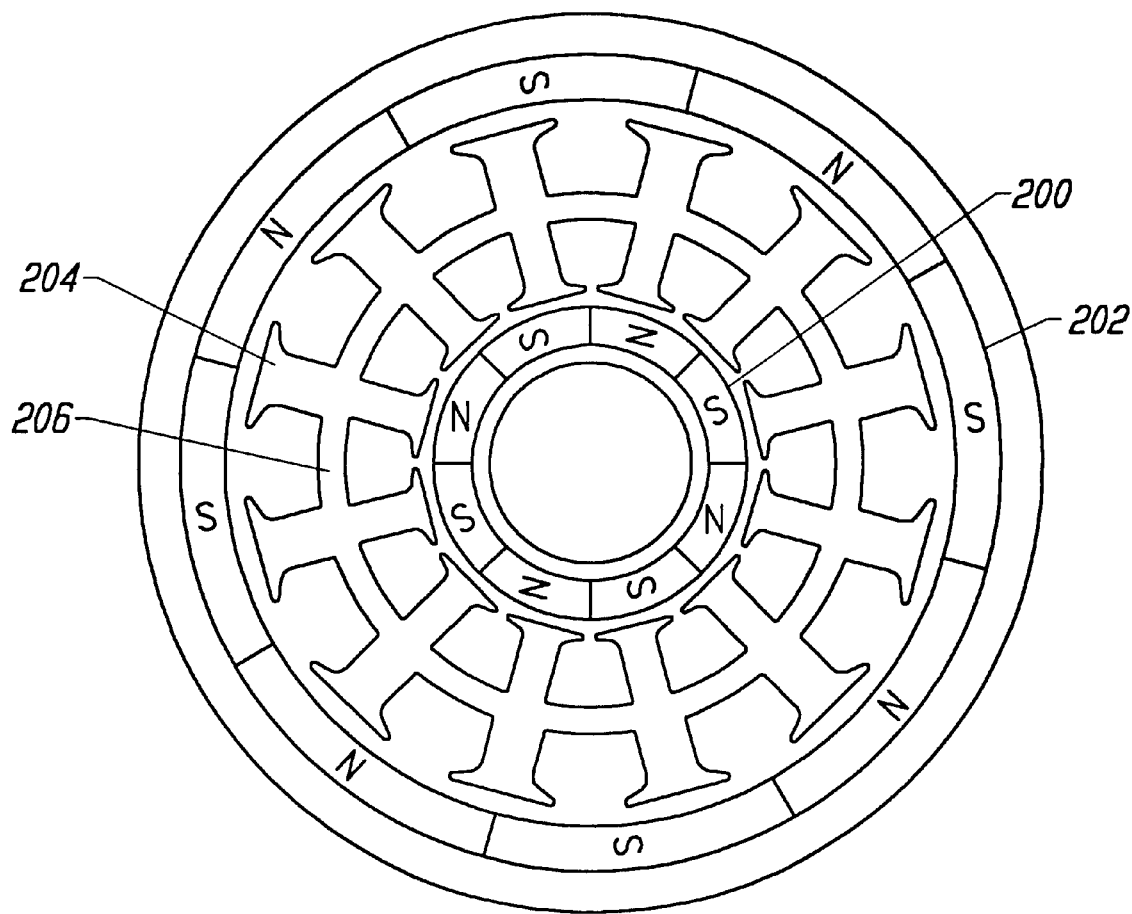
FIG. 15 shows a motor structure with two magnetic circuits.

FIG. 15 shows a motor structure that allows the use of the combination of all torque winding and radial force winding solutions. For this example, the inner and outer magnetic circuits have the same configuration (same pole and slot numbers), but could have different ones. That is the inner and outer magnetic rings 200, 202 have the same number of alternating poles, cooperating with slots 204 formed on either side of a central ring 206.

Particular Case of the Slotless Motor

For a slotless motor, as the windings are directly placed in the airgap between the rotor magnet and the stator yoke, there is no more compatibility problem between torque and radial force windings.

Figure 16A:
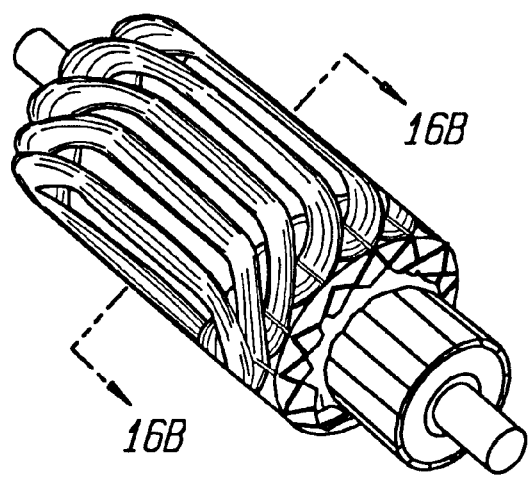
FIGS. 16A and 16B are a perspective and sectional view of a slotless motor winding (cylinder placed in the airgap).
Figure 16B:
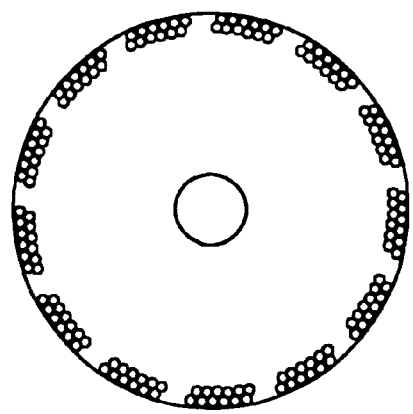

FIGS. 16A and 16B show an example of a motor with a slotless winding, which can be adapted to use the inventions. As the winding is a cylinder placed in the airgap, it is easy to place 2 windings in the same airgap as concentric cylinders.

Usual Torque Winding Solutions for a Slotless Motor

To build a three phase winding generating torque, the coil number per phase usually used is given by expression (a.51); the corresponding coil opening s is given by (a.52).

$$C_{ph} = 2 \cdot p \quad (a.51)$$

$$s = \frac{2 \cdot \pi}{2 \cdot p} \quad (a.52)$$

For such a winding, the coefficient $k_s$ given by (a.37) is always equal to 1. Table XII gives the usual configuration for a pair pole number up to 6.

TABLE XII

| pole number 2p | total coil number = 3 · 2 · p | angular rotation between coils | coil opening s |
|---|---|---|---|
| 2  | 6  | 60° | 180° |
| 4  | 12 | 30° | 90°  |
| 6  | 18 | 20° | 60°  |
| 8  | 24 | 15° | 45°  |
| 12 | 36 | 10° | 30°  | description of 3 phase slotless windings generating torque for different pole numbers.

Radial Force Winding Solutions for a Slotless Motor

To build 2 phase winding generating 2 radial forces in quadrature, the possible total coil numbers as a function of the pair pole number p is given by expressions (a.53) and (a.55); the corresponding coil opening is given by (a.54) or (a.56).

$$C_1 = (p-1) \cdot 4 \quad (a.53)$$

$$s_1 = \frac{2 \cdot \pi}{2 \cdot (p-1)} \quad (a.54)$$

$$C_2 = (p+1) \cdot 4 \quad (a.55)$$

$$s_2 = \frac{2 \cdot \pi}{2 \cdot (p+1)} \quad (a.56)$$

The following tables summarize all these possible motor configurations for a pair pole number up to 6.

Example for a 6 Poles; Slotless Motor

This example describe, for a 6 poles slotless motor, the windings generating torque and radial force.

To generate torque with a 3 phase winding, only one solution corresponds to a 6 pole motor (Table XII, above). This winding is composed of 18 coils. Table XIII gives each of the 18 coils their angular position $\alpha_i$, the phase shift angle ($p\alpha_i$) of their torque, and the phase shift angle (p+1) $\alpha_i$ and (p−1) $\alpha_i$ of the Cartesian components of the force generated by these coils.

TABLE XIII

| coil | $\alpha_1$ | p · $\alpha_1$ | (p − 1) · $\alpha_1$ | (p + 1) · $\alpha_1$ |
|---|---|---|---|---|
| 1 | 0 | 0 + | 0 | 0 |
| 2 | 20 | 60 | 40 | 80 |
| 3 | 40 | 120 | 80 | 160 |
| 4 | 60 | 180 − | 120 | 240 |
| 5 | 80 | 240 | 160 | 320 |
| 6 | 100 | 300 | 200 | 40 |
| 7 | 120 | 0 + | 240 | 120 |
| 8 | 140 | 60 | 280 | 200 |
| 9 | 160 | 120 | 320 | 280 |
| 10 | 180 | 180 − | 0 | 0 |
| 11 | 200 | 240 | 40 | 80 |
| 12 | 220 | 300 | 80 | 160 |
| 13 | 240 | 0 + | 120 | 240 |
| 14 | 260 | 60 | 160 | 320 |
| 15 | 280 | 120 | 200 | 40 |
| 16 | 300 | 180 − | 240 | 120 |
| 17 | 320 | 240 | 280 | 200 |
| 18 | 340 | 300 | 320 | 280 |

Tab. A.32: 18 coils with their angular position $\alpha_1$ the shift angle p $\alpha_1$ of the torque they generate, the Cartesian component shift angles (p − 1) $\alpha_1$ and (p + 1) $\alpha_1$ of the force they generate.

The analysis of table XIII shows that 3 coil groups generate torque that are in phase: group 1 (+1, −4, +7, −10, +13, −16), group 2: (+3, −6, +9, −12, +15, −18) and group 3: (−2, +5, −8, +11, −14, +17). Connecting in series the coils inside the same group will give 3 phases generating 3 torques delayed by 120 degrees, and no radial forces.

To generate 2 radial forces in quadrature with a 2 phase winding, 2 solutions correspond to a 6 pole motor (Tables A.30 and Tab. A.31). This winding can be composed by either 8 or 16 coils.

TABLE XIV

| pole number 2p | total coil number = 4 · (p − 1) | angular rotation between coils | coils opening |
|---|---|---|---|
| 2 | — | — | — |
| 4 | 4 | 90° | 180° |
| 6 | 8 | 45° | 90° |
| 8 | 12 | 30° | 60° |
| 12 | 20 | 18° | 36° |

Tab. A.30: description of a first solution group of 2 phase slotless windings generating radial forces for different pole numbers.

TABLE XV

| pole number 2p | total coil number = 4 · (p + 1) | angular rotation between coils | coils opening |
|---|---|---|---|
| 2 | 8 | 45° | 90° |
| 4 | 12 | 30° | 60° |
| 6 | 16 | 22.5° | 45° |
| 8 | 20 | 18° | 36° |
| 12 | 28 | 12.86° | 25.72° |

Tab. A.31: description of a second solution group of 2 phase slotless windings generating radial forces for different pole numbers.

Table XVI gives for the 8 coils of the first solution their angular position $\alpha_i$, the phase shift angle ($p\alpha_i$) of their torque, and the phase shift angle (p+1) $\alpha_i$ and (p−1) $\alpha_i$ of the Cartesian components of the force generated by these coils.

TABLE XVI

| coil | $\alpha_i$ | p · $\alpha_i$ | (p − 1) · $\alpha_i$ | (p + 1) · $\alpha_i$ |
|---|---|---|---|---|
| 1 | 0 | 0 | 0 + | 0 |
| 2 | 45 | 135 | 90 | 180 |
| 3 | 90 | 270 | 180 − | 0 |
| 4 | 135 | 45 | 270 | 180 |
| 5 | 180 | 180 | 0 + | 0 |
| 6 | 225 | 315 | 90 | 180 |
| 7 | 270 | 90 | 180 − | 0 |
| 8 | 315 | 225 | 270 | 180 |

Tab. A.33: 8 coils with their angular position $\alpha_i$ the shift angle p $\alpha_i$ of the torque they generate, the Cartesian component shift angles (p − 1) $\alpha_i$ and (p + 1) $\alpha_i$ of the force they generate.

The analysis of Table XVI shows that 2 coil groups generate forces with Cartesian components in (p−1) that are in phase: group 1: (+1, −3, +5, −7,) and group 2: (+2, −4, +6, −8). Connecting in series the coils inside the same group will give 2 phases generating 2 radial forces in quadrature and no torque.

How to Supply a 2 Phase Winding Generating a Radial Force

This section try to define the currents that must flow through the phases to generate a given radial force. It will be first assumed that the polar coordinates of the radial force are known, then it will be assumed that the rectangular Cartesian coordinates of the radial force are known.

Figure 17:
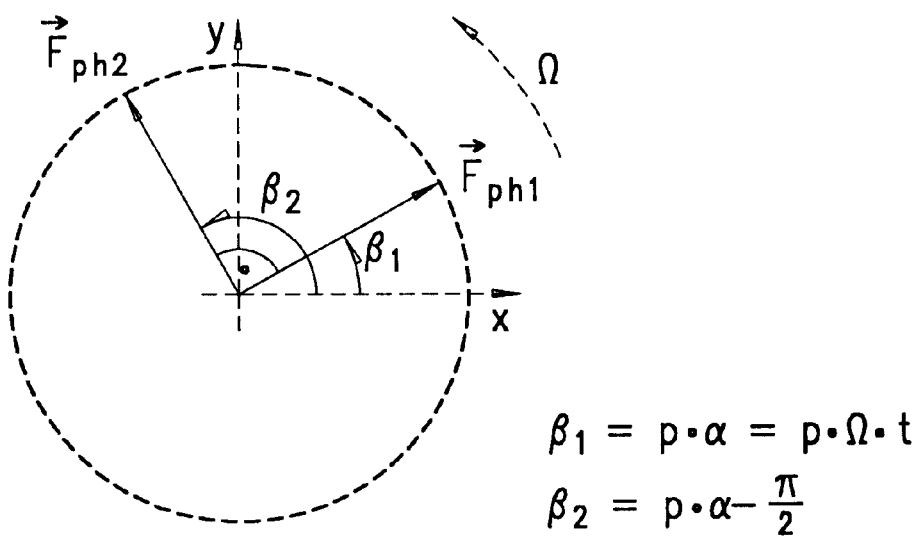
FIG. 17 shows two rotating radial forces in quadrature.

As it has been already discussed above, 2 rotating radial forces in quadrature are generated (FIG. 17) if the 2 phases of the windings presented in FIGS. 12 and 13 are supplied with the same constant current I. Expressions (a.42) to (a.45) described above, give the Cartesian components of the 2 forces generated by each phase.

Figure 18:
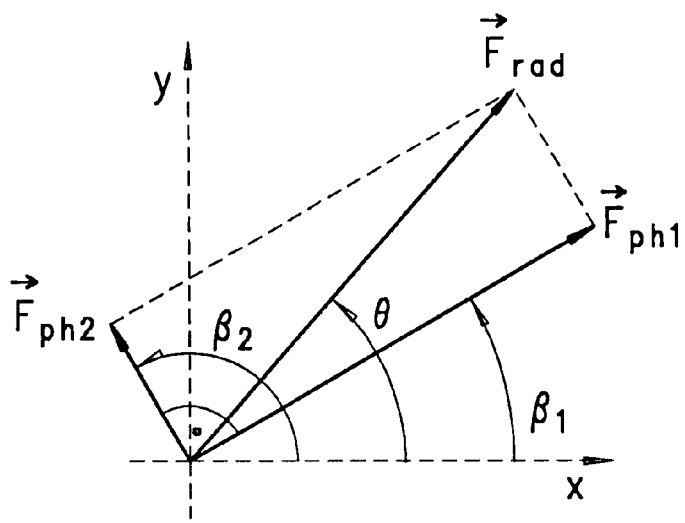
FIG. 18 shows a projection of the radial force vector onto the vectors of the forces generated by phases 1 and 2.

If the polar coordinates of the desired radial force are given, the phase currents can be determined by doing:

current of phase 1: the projection of the radial force vector onto the vector of the force generated by phase 1 (FIG. 18);

$$i_{ph1} = \frac{|F_{rad}|}{k_f} \cdot \cos(\theta - \beta_1) = \frac{|F_{rad}|}{k_f} \cdot \cos(\theta - p \cdot \alpha) \qquad (a.57)$$

current of phase 2: the projection of the radial force vector onto the vector of the force generated by phase 2 (FIG. 18).

$$i_{ph2} = \frac{|F_{rad}|}{k_f} \cdot \cos(\theta - \beta_2) \qquad (a.58)$$

$$= \frac{|F_{rad}|}{k_f} \cdot \cos\left(\theta - p \cdot \alpha + \frac{\pi}{2}\right) = -\frac{|F_{rad}|}{k_f} \cdot \sin(\theta - p \cdot \alpha)$$

Figure 19:
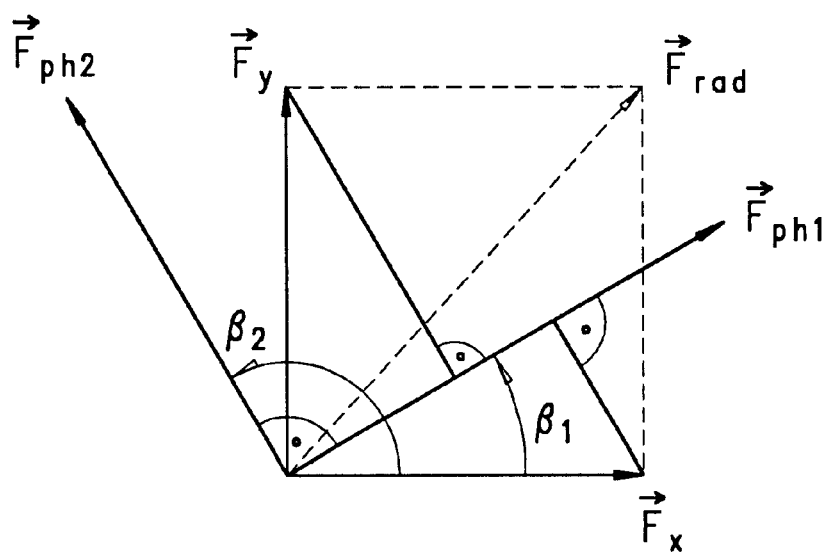
FIG. 19 shows projections of the x and y radial force component vectors on the vector of the force generated by phase 1.

If the Cartesian coordinates of the wanted radial force are given, the phase currents can be determined by doing:

current of phase 1: the projections of the vectors of the x and the y radial force components onto the vector of the force generated by phase 1 (FIG. 19):

$$i_{ph1} = \frac{F_x}{k_f} \cdot \cos(\beta_1) + \frac{F_y}{k_f} \cdot \cos\left(\frac{\pi}{2} - \beta_1\right) \qquad (a.59)$$

-continued $$= \frac{F_x}{k_f} \cdot \cos(p \cdot \alpha) + \frac{F_y}{k_f} \cdot \sin(p \cdot \alpha)$$

current of phase 2: the projection of the vectors of the x and the y radial force components onto the vector of the force generated by phase 2:

$$i_{ph2} = \frac{F_x}{k_f} \cdot \cos(\beta_2) + \frac{F_y}{k_f} \cdot \cos\left(\frac{\pi}{2} - \beta_2\right) \quad (a.60)$$

$$= \frac{F_x}{k_f} \cdot \sin(p \cdot \alpha) - \frac{F_y}{k_f} \cdot \cos(p \cdot \alpha)$$

It is also possible to determine the expressions (a.61) and (a.62) that give the x and y components of the total radial force as a function of the currents flowing in the 2 phases. From expressions E(a.42) to (a.45) we get:

$$F_x = k_f i_{ph1} \cdot \cos(p \cdot \alpha) + k_f i_{ph2} \cdot \sin(p \cdot \alpha) \quad (a.61)$$

$$F_y = k_f i_{ph1} \cdot \sin(p \cdot \alpha) - k_f i_{ph2} \cdot \cos(p \cdot \alpha) \quad (a.62)$$

How to Supply a 3 Phase Winding Generating a Radial Force

This section tries to define the currents that must flow through a 3 phase winding to generate a given radial force.

Figure 20:
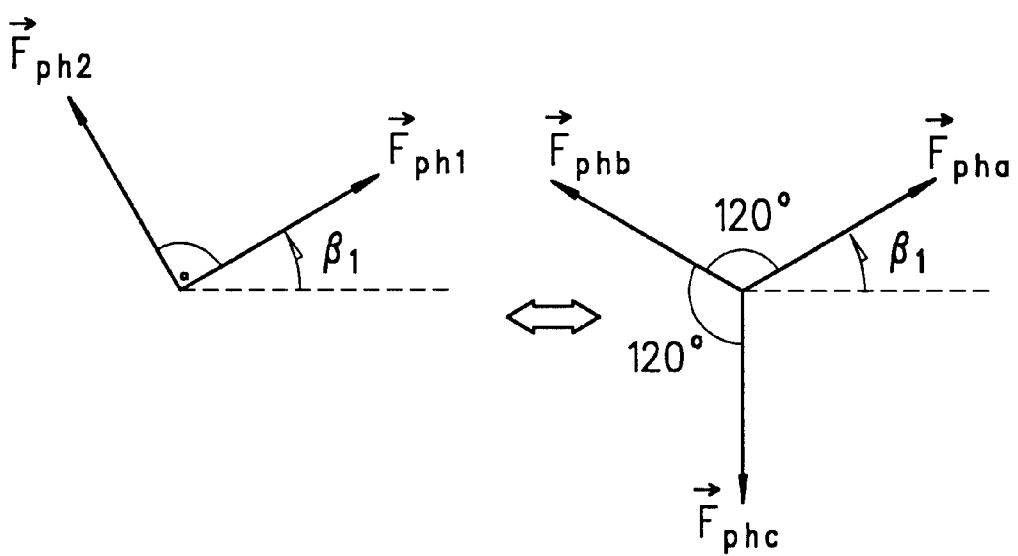
FIG. 20 shows the relationship between a sum of two forces in quadrature and a sum of three forces having directions are separated by 120°.

The simplest way to solve this problem is to determine the 3 phase winding currents from the 2 phase winding currents calculated in the previous section. This is equivalent to determining the relationships between a sum of 2 forces in quadrature and a sum of 3 forces which directions are separated by 120°, when both sums give the same final force (FIG. 20).

Using the complex numbers, expression (a 63) gives this equivalence, which represents 2 equations when there are 3 unknowns. In assuming that the 3 phase system is symmetric, the condition (a.64) introduces a third equation.

$$\underline{F} = F_{ph1} + F_{ph2} \cdot e^{j90} = F_{pha} + F_{phb} \cdot e^{j120} + F_{phc} \cdot e^{j240} \quad (a.63)$$

$$F_{pha} + F_{phb} + F_{phc} = 0 \quad (a.64)$$

The equation system given by expressions (a.63) and (a.64), gives the transformation relationships that allow the 3 phase current determination from the 2 phase currents given by expressions (a.57) and (a.58) for a radial force in polar coordinates and by expressions (a.59) and (a.60) for a radial force in Cartesian coordinates:

$$F_{pha} = \frac{2}{3} \cdot F_{ph1} \Rightarrow i_{pha} = \frac{2}{3} \cdot i_{ph1} \quad (a.65)$$

$$F_{phb} = \frac{1}{\sqrt{3}} \cdot F_{ph2} - \frac{1}{3} \cdot F_{ph1} \Rightarrow i_{phb} = \frac{1}{\sqrt{3}} \cdot i_{ph2} - \frac{1}{3} \cdot i_{ph1} \quad (a.66)$$

$$F_{phc} = -\frac{1}{\sqrt{3}} \cdot F_{ph2} - \frac{1}{3} \cdot F_{ph1} \Rightarrow \quad (a.67)$$

$$i_{phc} = -\frac{1}{\sqrt{3}} \cdot i_{ph2} - \frac{1}{3} \cdot i_{ph1}$$

Assuming that condition (a.64) is respected, the inverse transformation is given by:

$$F_{ph1} = \frac{3}{2} \cdot F_{pha} \quad (a.68)$$

$$F_{ph2} = \frac{\sqrt{3}}{2} \cdot F_{pha} + \sqrt{3} \cdot F_{phb} \quad (a.69)$$

Electronic Calculation of the Currents Flowing Through the Radial Force Winding

This section presents an electronic solution to calculate the currents that must flow through the phases generating a radial force. It is assumed that the rectangular Cartesian coordinates of the radial forces are known. Considering a 2 phase winding, the phase currents can be calculated with expressions (a.59) and (a.60).

Figure 21:
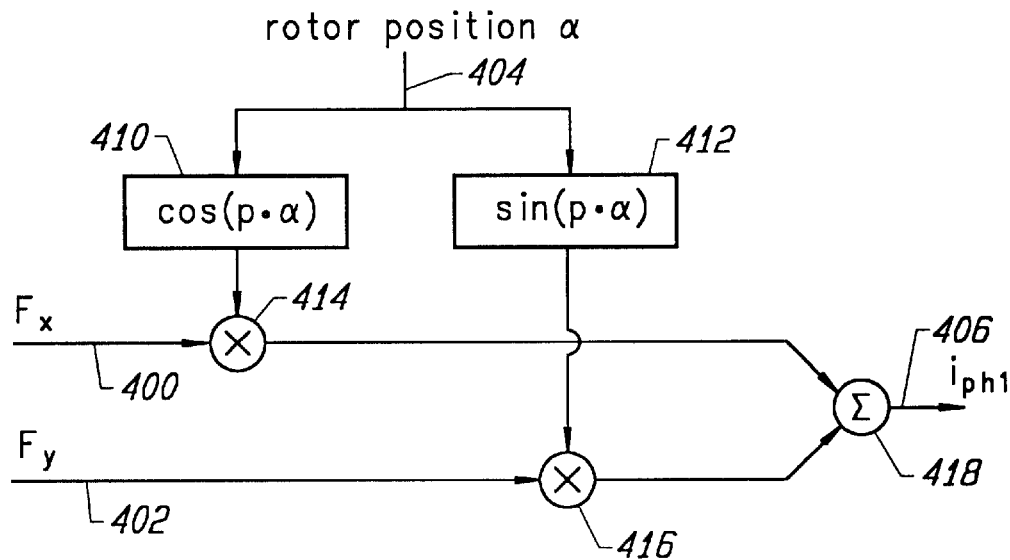
FIG. 21 is a block diagram of the phase one current calculation (expression a.59).

FIG. 21 presents a block diagram of phase 1 current determination (corresponding to expression (a.59)). In order to make the calculation, inputs 400, 402 are the x and y radial force components and the input 404 represents rotor position; the output 406 is the current value. Means are provided for processing two trigonometric functions 410, 412, having arguments are a function of the rotor position, two multiplications 414, 416 and one addition 418 of the multiplier outputs.

Figure 22:
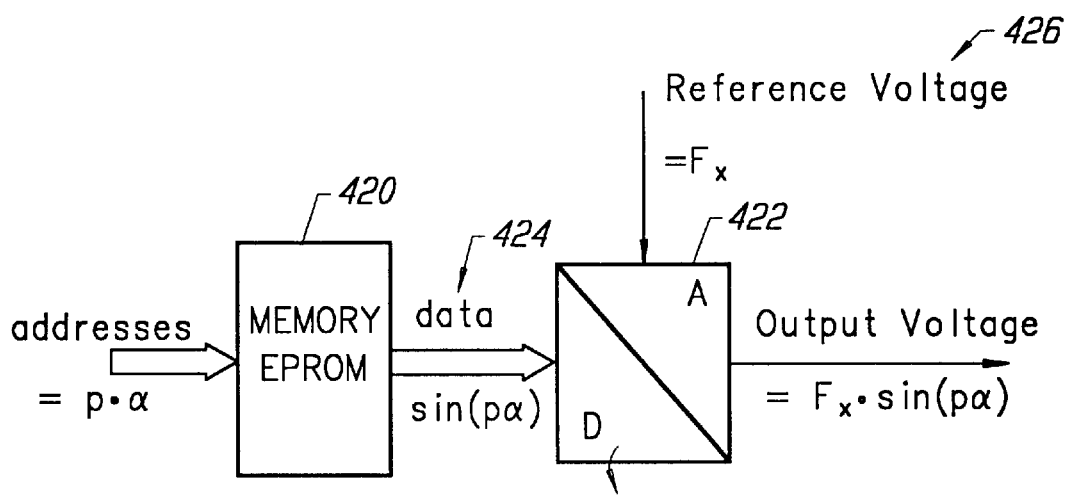
FIG. 22 is a block diagram of means for processing one trigonometric function and one multiplication.

FIG. 22 presents an electronic solution which includes processing one trigonometric function and one multiplication, thereby implementing the functions of blocks 410, 414 or blocks 412, 416. This approach is of course only exemplary. An EPROM memory 420 is addressed with the argument of the trigonometric function. The memorized value of this function for the corresponding argument is then transferred to a Digital to Analog Converter 422 via the EPROM Data Bus 424. The voltage reference input 426 of the D/A Converter based on the input radial force component 400 or 402 is then used to process the multiplication.

The most accurate approach requires generating the EPROM memory addresses used to access memory 420 as a function of the rotor position as drawing in FIG. 21. Solutions using resolver or optical encoder are of course possible (although expensive). Solutions using a Phase Lock Loop chip as a frequency multiplier are also a possible alternative, utilizing the motor driver commutation frequency as the input frequency.

Figure 23:
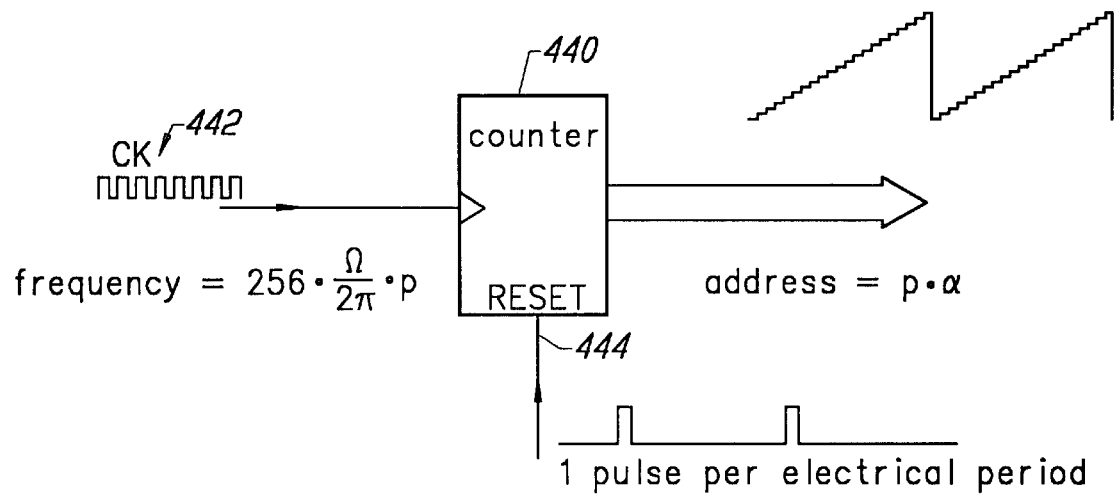
FIG. 23 is a block diagram of means for generating the EPROM addresses as a function of the rotor position.

A simple solution (FIG. 23) assumes that the motor speed stays fairly constant or has at worst a slow variation (that can be achieved with a system with a fairly large inertia). It uses a counter 440 incremented on the falling edge of an input clock 442, which frequency is proportional to the motor rotating speed Ω (where p is the motor pair pole number). To guarantee the synchronism, the counter is reset to a low level by applying one pulse per electric period on its reset input 444, as shown.

The input clock frequency can be maintained constant in constant speed applications like the spindle motor of a hard disc drive, making the solution even simpler. The reset pulse can be provided by the motor driver in such a constant speed application.

For applications with slow speed variation, the input clock frequency 442 has to be computed, after regularly measuring the speed. The input clock can then be generated with a voltage to frequency converter. The periodic counter reset will then periodically correct the effect of frequency inaccuracies caused by changes in speed.

Figure 24:
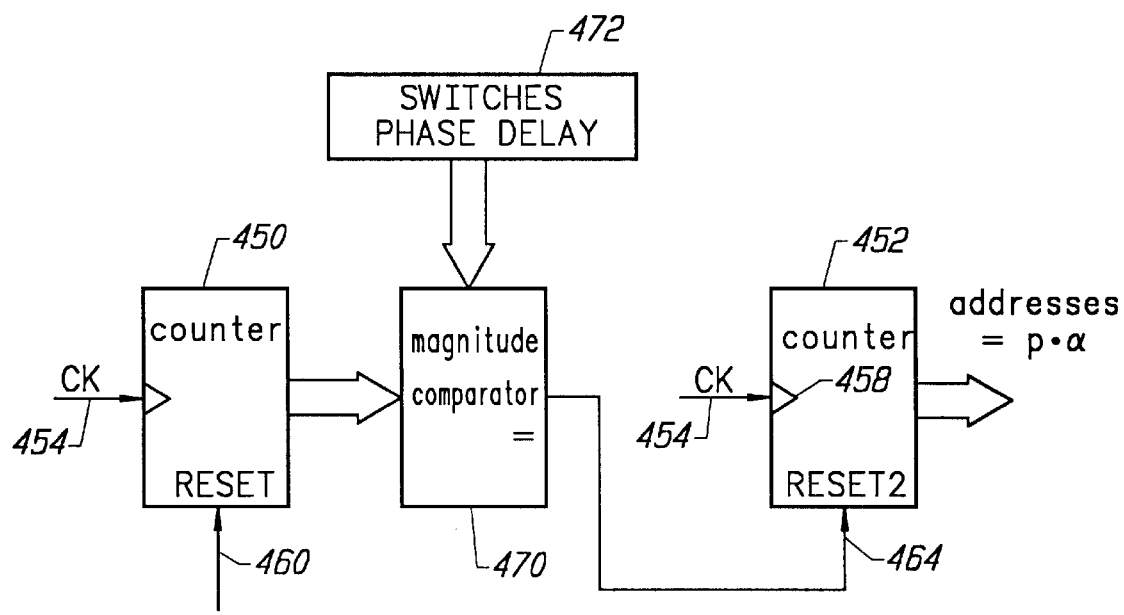
FIG. 24 is a block diagram of means for generating the EPROM addresses as a function of the rotor position, with phase delay adjustment.
Figure 25:
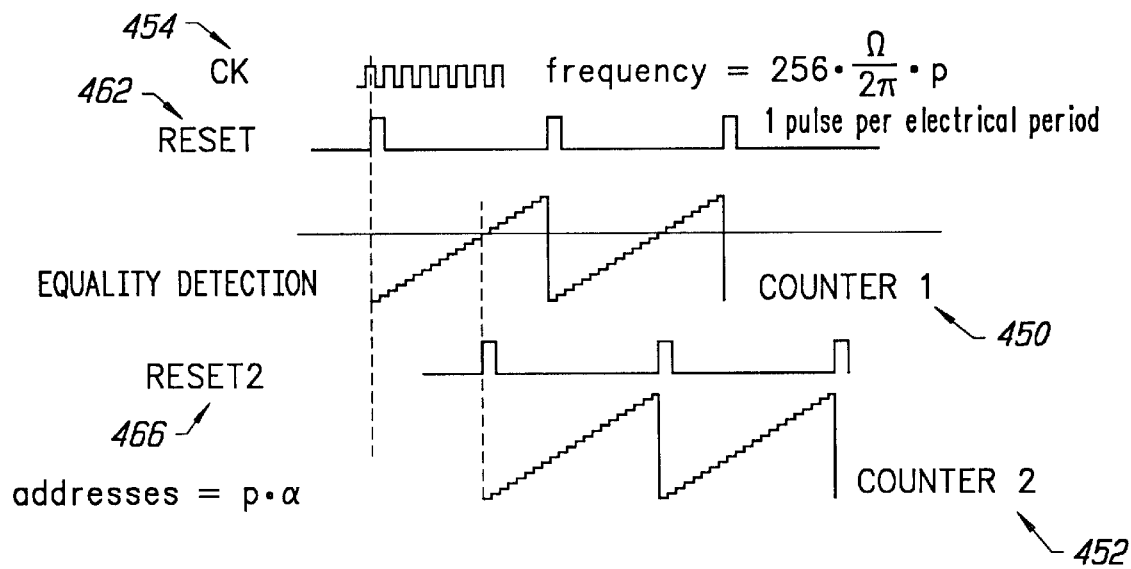
FIG. 25 is a timing diagram corresponding to the block diagram of FIG. 24.

As in every synchronous system, it is important to be able to control the phase. FIG. 24 presents a second solution incorporating phase delay adjustment utilizing timing signals shown in FIG. 25. This solution uses two identical counters incremented with the same input clock signal 454 at input 456 or 458. The first counter 450 is reset to a low level by applying one pulse per electric period on its reset input 460 utilizing reset 462 shown in FIG. 25. The second counter 452 is reset to a low level by applying one pulse on its reset input 464 utilizing reset 2, 466 each time the first counter value is equal to a switch programmed value 480, shown in FIG. 25. A magnitude comparator 470 compares the output of counter 450 with a phase delay value set by switches 472. The outputs of the two counters, as well as the time when the RESET2, 466 pulse is triggered is shown in FIG. 25. It can be seen that the shift in timing of the pulse 466 causes a corresponding phase shift in the output 452. FIG. 25 gives the timing diagram of the FIG. 24 implementation.

Figures 26A, 26B:
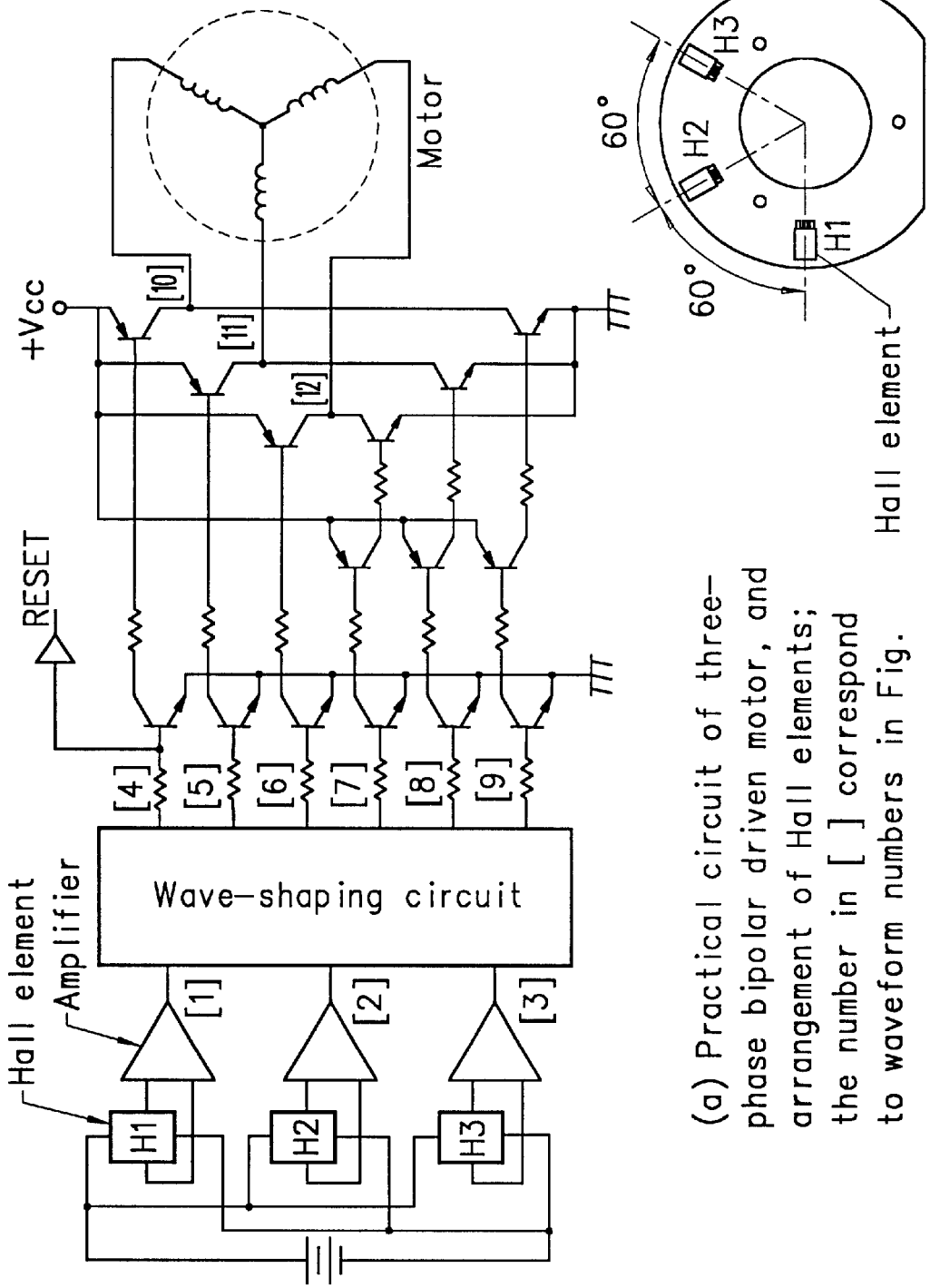
FIG. 26 is a circuit diagram using a transistor command signal of the motor driver to generate one pulse per electrical period.

FIG. 26 illustrates how the reset pulse can be provided by the motor driver. For this example, the logical command [4] of one of the 6 transistors supplying the motor is used: a pulse will be generated at every raising edge of this signal (FIG. 27).

Figure 28:
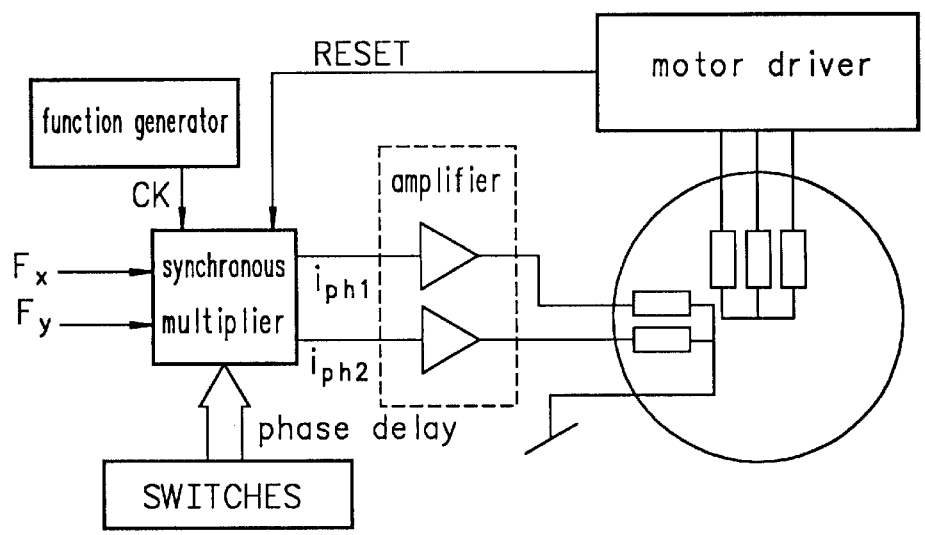
FIG. 28 is a block diagram for generating radial force utilizing a two-phase winding.

Summary of the Electronic Calculation of the Currents Flowing Through the Radial Force Winding FIG. 28 shows through a block diagram how the electronic solution presented in the previous section can be inserted in the complete system. The block called "synchronous multiplier" 600 processes the 2 current consigns ($i_{ph1}$ and $i_{ph2}$) as a function of the radial force Cartesian components ($F_x$ and $F_y$) which are found as described below. Two current amplifiers 602, 604 are then used to supply the 2 phase radial force winding 606 of the motor 608. The standard motor windings 610 are also shown. Other details of this block diagram can be found in the incorporated application.

Figure 27:
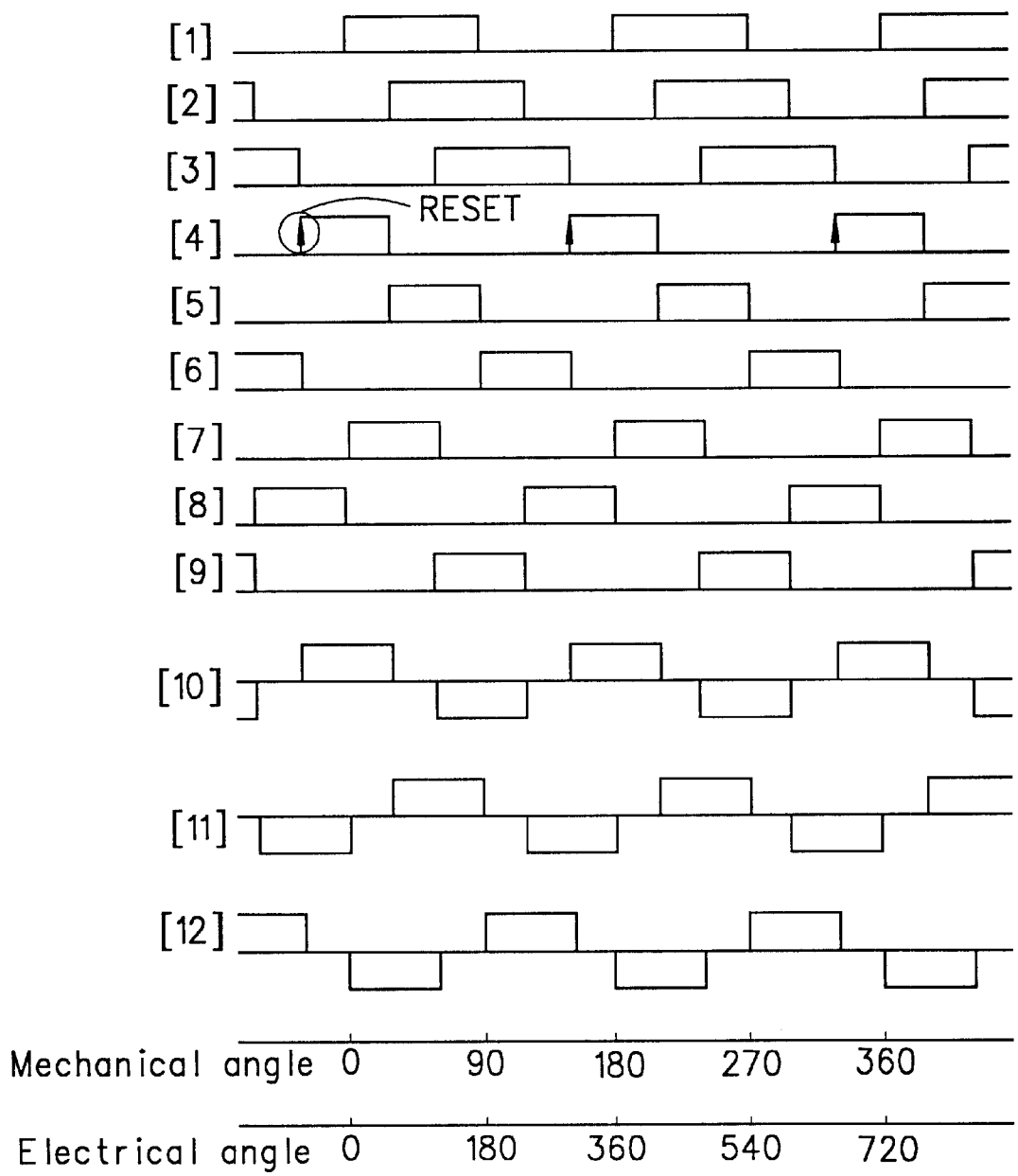
FIG. 27 illustrates using a transistor command signal of the motor drive to generate one pulse per electrical period; the timing diagram is related to the circuit of FIG. 26.
Figure 29:
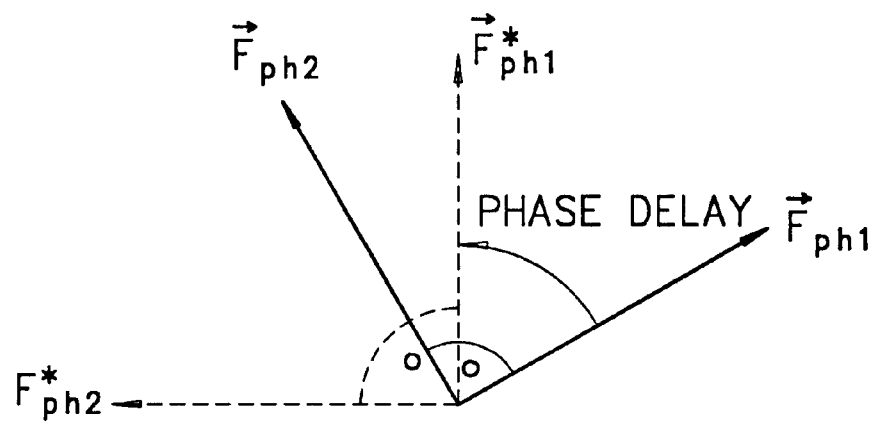
FIG. 29 shows the phase delay effect on the radial force direction.

Three other inputs have to be provided for the synchronization of the "synchronous multiplier":
  an input clock CK 612 with a frequency proportional to the motor speed; it can be generated by a function generator 614 of a known, standard design for constant speed applications as described above;
  a RESET signal 616 with one pulse per electrical period; this signal can be provided by the motor driver 618 as shown in FIGS. 26 and 27 and is the leading edge 617 of the periodic command signal to one phase of the motor 608. Obviously any regularly repeating signal representing rotational position of the motor can be used;
  a switch programmed phase delay value 620 that allows a direction adjustment of the generated radial force. FIG. 29 shows the phase delay effect on the radial force direction and is explained more fully below.

Phase Delay Effect

FIG. 29 shows how the phase delay influences the direction of the force generated by the currents flowing in the 2 phase radial force winding 606 (FIG. 28). For a given rotor position and two given phase currents, phase delay modification can be utilized to provide a 360 degree rotation of the resulting radial force.

For most applications, it is important to adjust the radial force direction relative to some reference that can be for example the position of a motion probe.

As the system described herein allows phase delay adjustment, it is useful to present some adjustment methods. In the case of a ball bearing motor, the problem is difficult, because the actuator applies a radial force on a rotor supported by 2 stiff bearings, impeding static direction measurement of the resulting displacement. Obviously, the methods and apparatus described herein can be used with motors with other types of bearings, such as ball bearings and the like.

The next section will present a method using the response to a rotating radial force excitation. As this method uses measurement to adjust the radial force direction, it is less sensitive to position inaccuracy. An automatic algorithm using this method has been developed.

Figure 30:
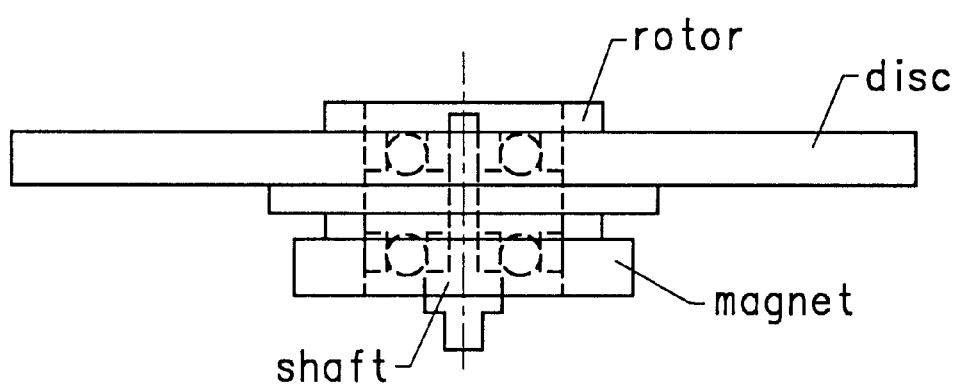
FIG. 30 is a vertical section of a hard drive spindle motor.

Phase Delay Adjustment Using the Response to an Rotating Radial Force Excitation This section present a radial force direction adjustment method that has been used in an hard disc drive application. In this example, the spindle motor is used as an actuator to control the gyroscopic motion of the rotor 400, which is supported by two ball bearings 702, 704 (FIG. 30) on shaft 705. Using the system presented in this work, a radial force will be applied on the magnet 706 of the rotor to suppress any unwanted motion of the disc 708 supported on the rotor.

This application uses two capacitive probes 800, 802 associated preferably with rotor 700 of motor 608 to measure the gyroscopic motion of the rotational axis or shaft 705. From these measures, some feedback will be calculated and applied through the radial force actuator which in this example, comprises the added windings. To obtain a stable system, it is then very important to adjust the direction of the correction force relative to the reference direction corresponding to the positions of the probes 800, 802.

Figure 31:
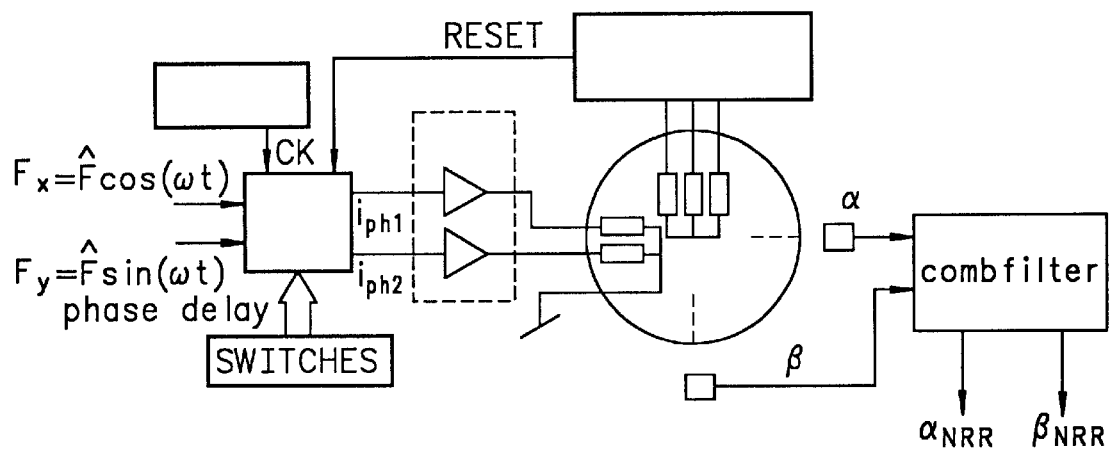
FIG. 31 is a block diagram of a circuit for measuring the response to a rotating radial force exitation.
Figure 32:
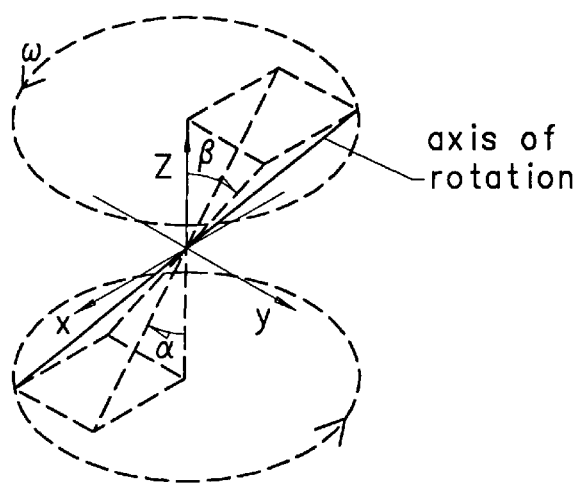
FIG. 32 illustrates the definition of the rotational axis angular position.

The method uses the actuator itself to excite the gyroscopic motion with a rotating radial force as described in FIG. 31. The two capacitive probes 800, 802 are then used to measure the excitation response given by the angular positions a and β of the axis of rotation 900 (FIG. 32). Further details of the operation of the system of this block diagram appear in the incorporated application.

As the Run Out of the system is higher in magnitude than the motion being measured, a comb 810 filter is used to separate the components that are synchronous with the motor speed from components that are not (called Non Repeatable Runout).

Figure 33:
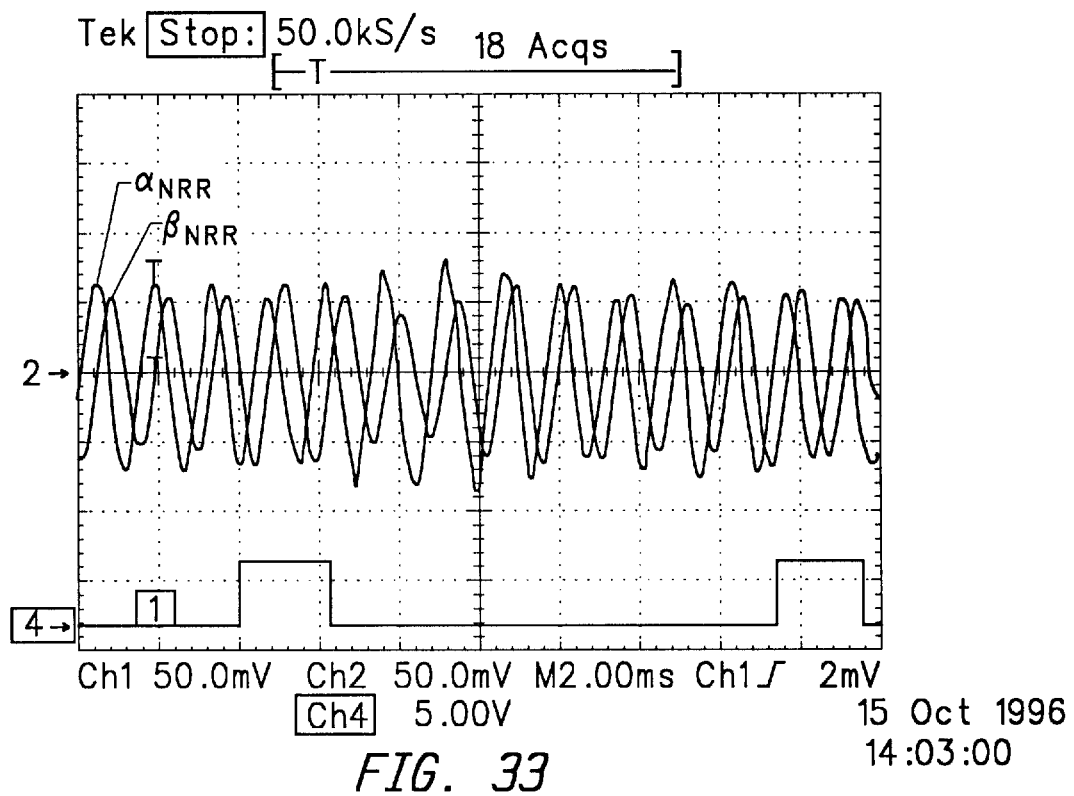
FIG. 33 illustrates the exitation of the forward gyroscopic mode, measurement of the NOR components of α and β, applied against a signal providing one pulse per revolution.
Figure 34:
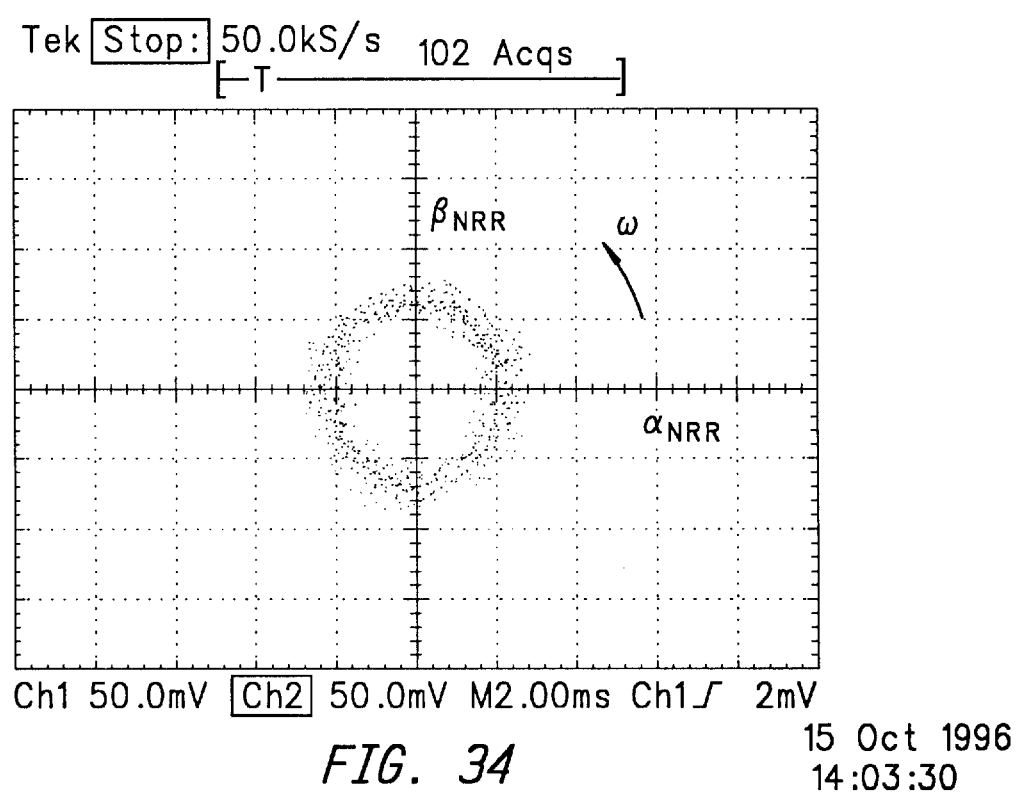
FIG. 34 illustrates the exitation of the forward gyroscopic mode; also shown is a Lissajou figure of the NRR components of α and β.
Figure 35:
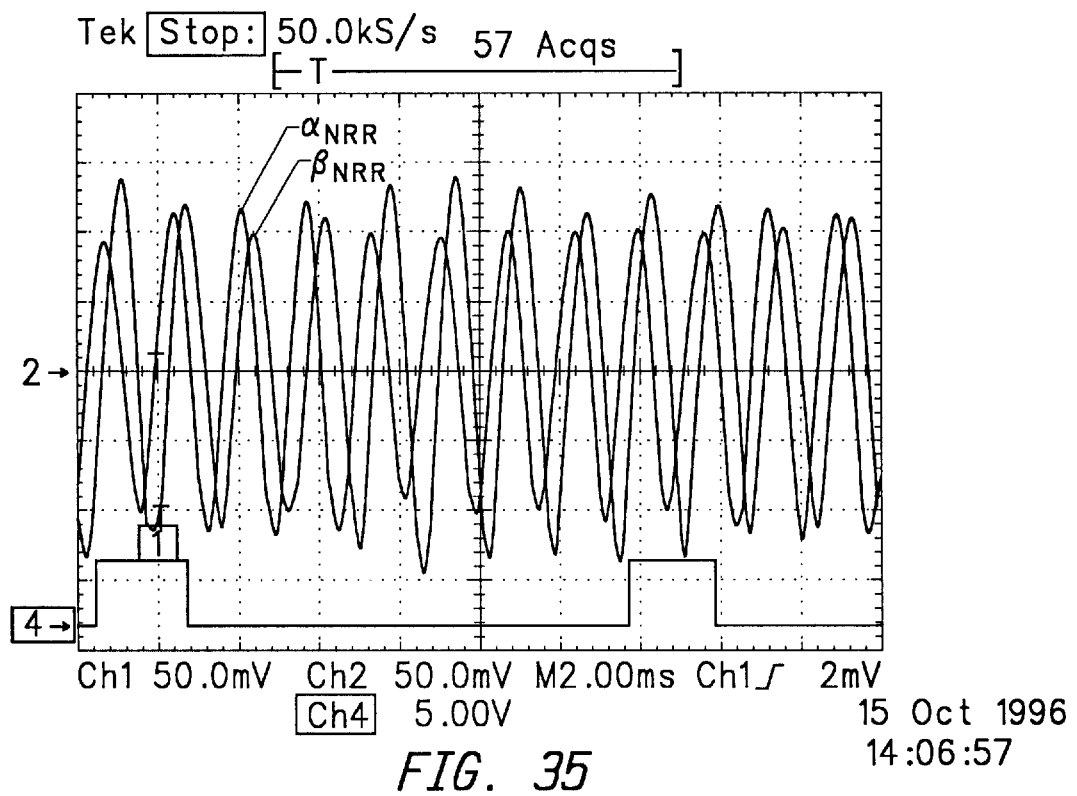
FIG. 35 illustrates the exitation of the backward gyroscopic mode, and measurement of the NRR components of α and β; a signal providing one pulse per revolution is also shown.
Figure 36:
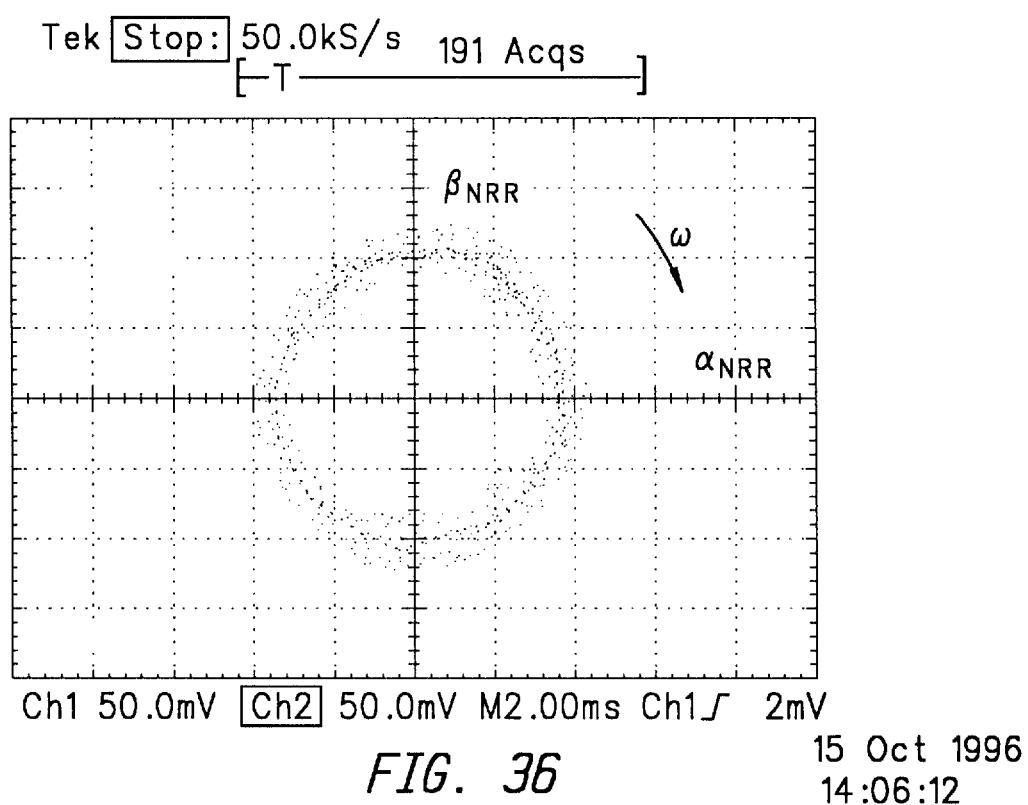
FIG. 36 illustrates the exitation of the backward gyroscopic mode; also shown is a Lissajou figure of the NRR components of α and β.

FIGS. 33 and 34 show a response measure for a forward excitation and FIGS. 35 and 36 show a response measured for a backward one. As the responsive Lisajou figures are close to a circle, we can conclude that a rotating movement is effectively generated. These measurements demonstrate that the described system works well and allows the generation of radial force with a controllable direction.

Figure 37:
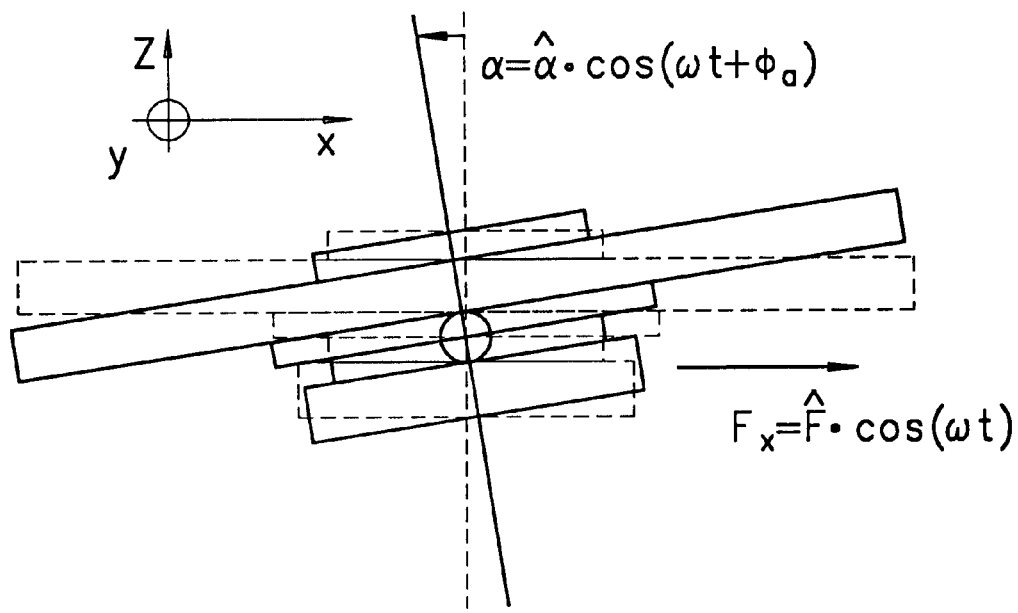
FIG. 37 shows rotor motion in plane xz.
Figure 38:
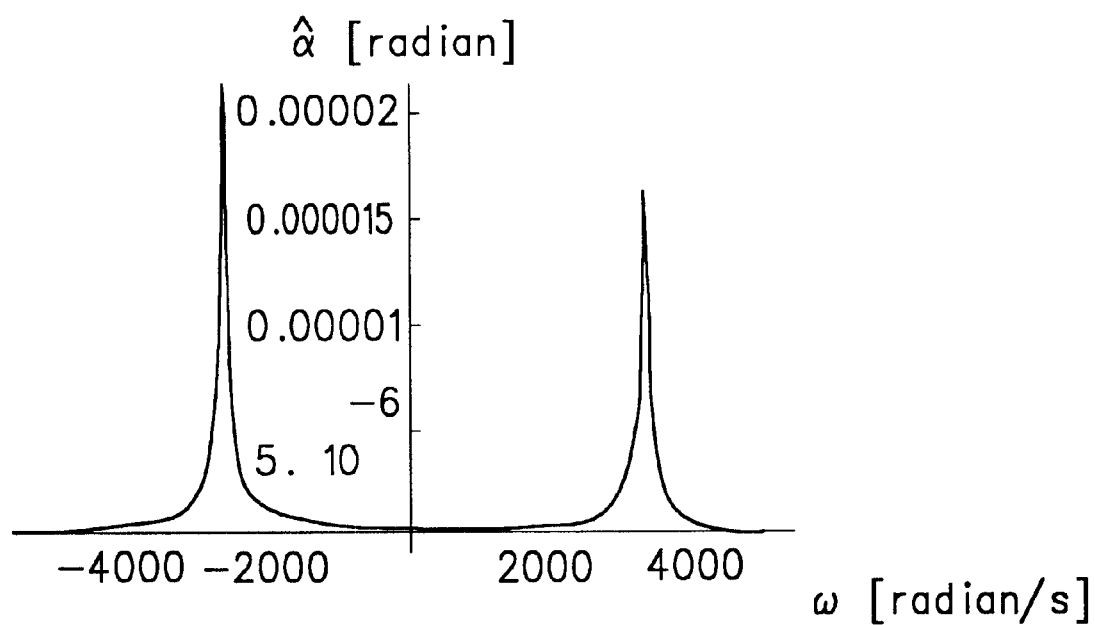
FIG. 38 is a bode plot of a wave magnitude.

To adjust the direction of the radial force, the angular position α and the radial force $F_x$ are assumed to be in the same plane zx (FIG. 37). The temporal variation of these 2 variables is sinusoidal. Both waves have the same frequency and a phase delay that depends on the pulsation ω. If the magnitude of the rotating radial force is maintained constant and its pulsation ω is varied, FIG. 38 shows the variation of the magnitude of the α wave and FIG. 39 the phase delay between Fx wave and α wave.

Figure 40:
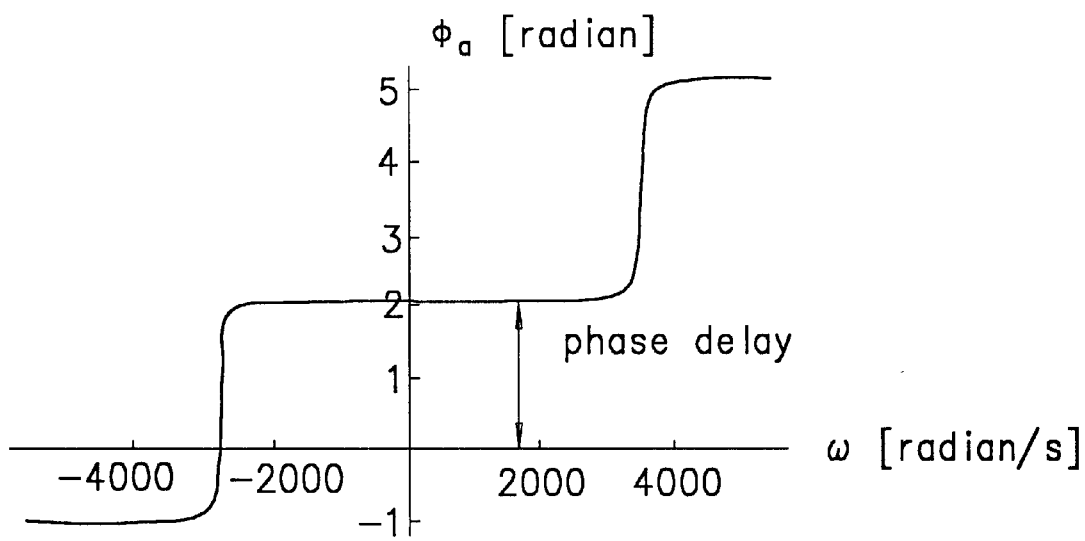
FIG. 40 is a bode plot of the a wave phase delay including the effect of synchronous multiplier phase delay.

The radial force direction adjustment can then be done in using the phase Bode plot of the a wave. FIG. 40 shows the effect of a phase delay on this Bode plot. In measuring the phase of the α wave, it is possible to calculate the phase delay of the synchronous multiplier 600 responsive to switches 620 (FIGS. 28, 31) that will give a radial force with the desired direction.

Temporal Delay Compensation

Figure 39:
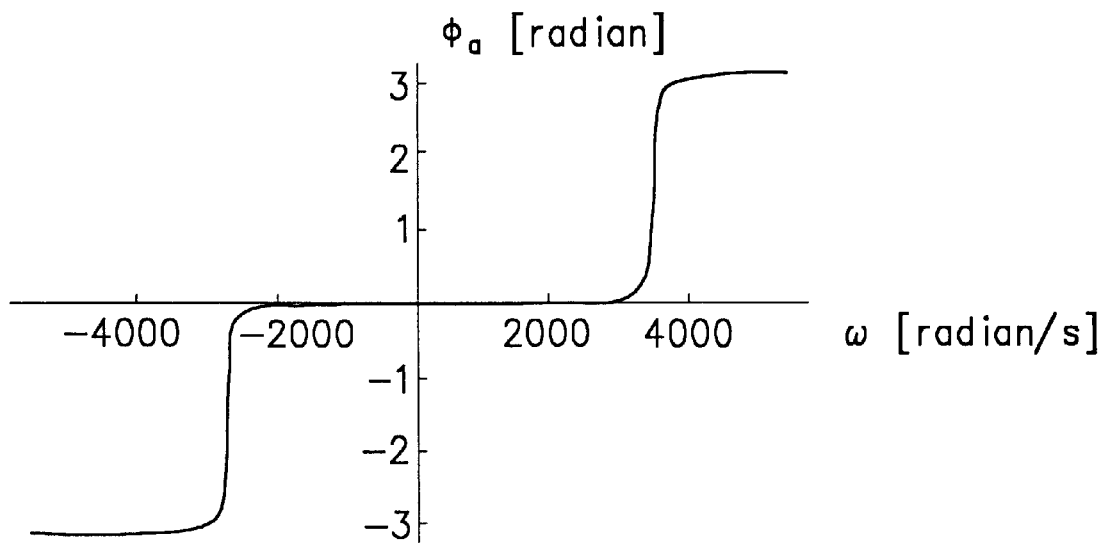
FIG. 39 is a bode plot of a wave phase delay.
Figure 41:
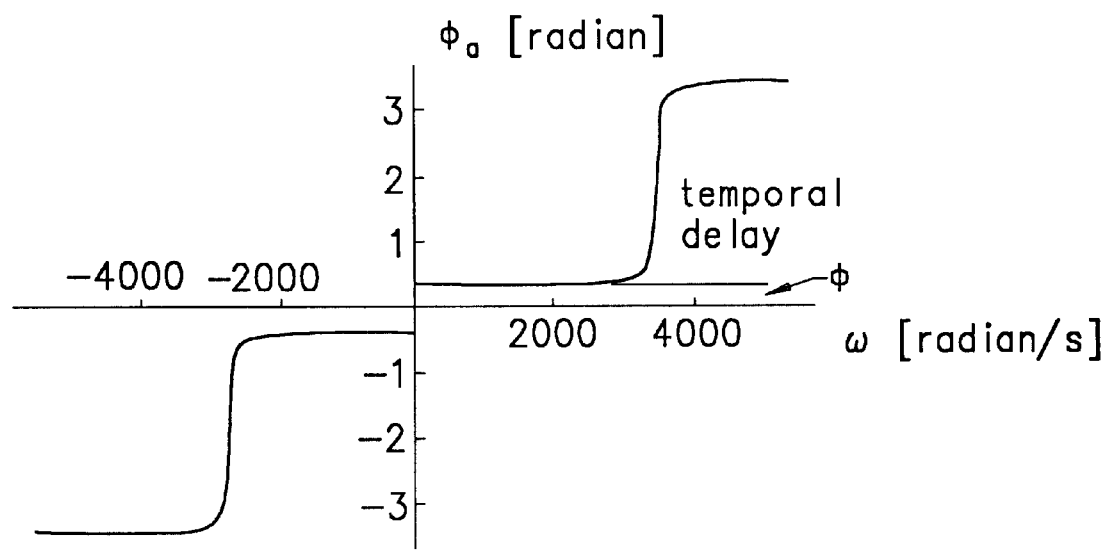
FIG. 41 is a bode plot of the a wave phase delay, including the temporal delay introduced by the current amplifiers and by the measurement system.

FIG. 39 presents an ideal situation where the delay introduced by the system components is neglectable. The reality is different, components such the current amplifiers, the capacitive probe and the comb filter introduce temporal delays corresponding to about 20 electrical degrees for the gyro frequencies (FIG. 41).

Figure 42:
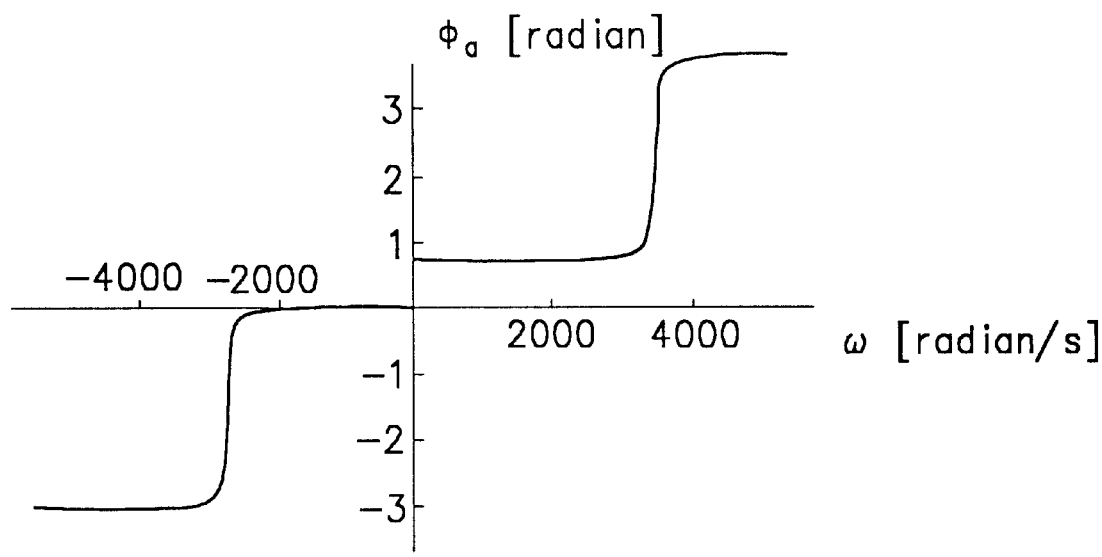
FIG. 42 illustrates correction of the temporal delay of the backward gyroscopic mode with a synchronous multiplier phase delay.

Theoretically, the synchronous multiplier 600 phase delay could be used to compensate for the temporal delay; FIG. 42 shows that this is probably not practical as a backward temporal delay.

Other features and advantages of the present invention will be apparent to a person of skill in this field who studies this invention disclosure.

What is claimed is:

1. An apparatus for stabilizing the spin axis of a rotating system comprising a disc drive, said rotating system comprising:
    a rotor carrying an inertial load comprising at least one disc and bearing means to support said rotor and said disc about said spin axis, and
    a motor to cause rotation of said rotor about said spin axis comprising:
        a first set of windings;
        a magnet supported radially adjacent the windings;
        a source of drive current for causing relative rotation between said windings and said magnet; and
        an actuator combined with the motor and comprising a source of actuator current energizing said windings to generate a radial correction force which stabilizes the position of said spin axis and dampens movements of said rotor and disc, including probes associated with said rotor to measure a gyroscopic motion of said rotor of said shaft, at least one output of said probes being processed to establish a signal applied to energize said windings and stabilize said system and a comb filter responsive to the output of said probe to separate components that are synchronous with the speed of said motor of said rotating system from components that are not synchronous with said motor speed and represent oscillatory movements of said rotor to be dampened.

2. An apparatus as claimed in claim 1 including means for adjusting the direction of said radial correction force relative to a reference direction corresponding to the position of said probes.

3. An apparatus as claimed in claim 2 including means for modifying the magnitude of said current applied to said windings to adjust the magnitude of the correction force applied to said rotor.

4. Apparatus as claimed in claim 1 wherein said actuator current and said drive current are separately applied in time to said windings.

5. Apparatus as claimed in claim 1 wherein said actuator current and said drive current are simultaneously applied to said windings.

6. An apparatus as claimed in claim 1 wherein said windings of said motor means are wound or a stator having a plurality of slots with each winding being wound in one of said slots.

7. An apparatus for stabilizing the spin axis of a rotating system comprising a disc drive, said rotating system comprising:
    a rotor carrying an inertial load comprising at least one disc and bearing means to support said rotor and said disc about said spin axis, and
    a motor to cause rotation of said rotor about said spin axis comprising:
        a first set of windings;
        a magnet supported radially adjacent the windings;
        a source of drive current for causing relative rotation between said windings and said magnet; and
        an actuator combined with the motor and comprising a source of actuator current energizing said windings to generate a radial correction force which stabilizes the position of said spin axis and dampens movements of said rotor and disc, including probes associated with said rotor to measure a gyroscopic motion of said rotor of said shaft, at least one output of said probes being processed to establish a signal applied to energize said windings and stabilize said system wherein said motor has a slotless winding, and said first windings are concentric but placed in the same airgap between a core and the rotating magnets of said motor.

8. An apparatus for stabilizing the spin axis of a rotating system comprising a disc drive, said rotating system comprising:
    a rotor carrying an inertial load comprising at least one disc and bearing to support said rotor and said disc about paid spin axis, and
    a motor to cause rotation of said rotor about said spin axis comprising:
        a first set of windings;
        a magnet supported radially adjacent the windings;
        a source of drive current for causing relative rotation between said windings and said magnet; and
        an actuator combined with the motor and comprising a source of actuator current energizing said windings to generate a radial force which stabilizes the position of said spin axis and dampens movements of said rotor and disc further comprising;
        means for sensing movements of said rotor;
        comb means for separating non-repeating movements from repeating movements of said rotor;
        said actuator being responsive to said comb means to stabilize said rotor.

9. An apparatus as claimed in claim 8 wherein said actuator comprises the first set of windings and second windings, which are separately wound and separately energized to generate two radial forces in quadrature.

10. An apparatus as claimed in claim 8 comprising means for generating a signal defining each of said currents having first and second input signals representing components of said radial force to be generated, and a third input representing motor position;
    memory means addressed with an argument of a function based on said rotor position for providing a trigonometric function based output based on said position; and
    multiplier means responsive to said trigonometric function based output signal and said first and second input signals representing components of said radial force to generate elements of a said signal defining said currents.

11. An apparatus as claimed in claim 8 wherein said multiplier means comprises a digital/analog converter having said trigonometric based output signals as one input and one of said first and second signals representing said radial force as another input.

12. An apparatus as claimed in claim 8 including means for regularly resetting said signal generating means responsive to a motor driven pulse so that reset is proportional to motor rotational speed.

13. An apparatus as claimed in claim 8 including a circuit for incorporating an adjustable phase delay into said means for generating a current defining signal.

14. An apparatus as claimed in claim 13 wherein said windings comprises at least the first windings and second windings, which are separately wound and separately energized to generate radial forces to stabilize the motor.

15. An apparatus as claimed in claim 14 wherein said motor includes a stator having a plurality of slots, said windings being wound in said slots.

16. An apparatus as claimed in claim 15 including circuit means for separately energizing each of said phases in order to modify the magnitude and direction of said radial force.

* * * * *